(12) United States Patent
Kapoor et al.

(10) Patent No.: US 10,541,978 B2
(45) Date of Patent: *Jan. 21, 2020

(54) DEIDENTIFIED ACCESS OF CONTENT

(71) Applicant: Pearson Education, Inc., New York, NY (US)

(72) Inventors: Vishal Kapoor, Iowa City, IA (US);
Cole Joseph Cecil, Coralville, IA (US);
David Earl Rodgers, Iowa City, IA (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,293

(22) Filed: Jun. 28, 2018

(65) Prior Publication Data

US 2018/0309730 A1 Oct. 25, 2018

Related U.S. Application Data

(63) Continuation of application No. 15/456,018, filed on Mar. 10, 2017, now Pat. No. 10,057,215, which is a
(Continued)

(51) Int. Cl.
*H04L 29/06* (2006.01)
*G06F 21/62* (2013.01)
(Continued)

(52) U.S. Cl.
CPC ........ *H04L 63/0414* (2013.01); *G06F 16/955* (2019.01); *G06F 21/6254* (2013.01);
(Continued)

(58) Field of Classification Search
CPC .............. H04L 63/0414; G06Q 20/385; G06F 21/6254
(Continued)

(56) References Cited

U.S. PATENT DOCUMENTS 4,175,339 A 11/1979 Jones et al.
5,947,747 A 9/1999 Walker et al.
(Continued)

FOREIGN PATENT DOCUMENTS

DE 10327291 A1 2/2005

OTHER PUBLICATIONS

Ai, et al., "Design and Development of Learning Management System at Universiti Putra Malaysia: A Case Study of e-Sprint", ACM, 2006, 3 pages.
(Continued)

*Primary Examiner* — Lynn D Feild
*Assistant Examiner* — Viral S Lakhia
(74) *Attorney, Agent, or Firm* — Quarles and Brady LLP

(57) ABSTRACT

Generally, embodiments of the invention are directed to methods, computer readable medium, servers, and systems for deidentified access of data. The deidentified access is permitted with the use of an identifier that uniquely indicates an outcome, the coding of the identifier obscures unaided human interpretation of the outcome, and the identifier uniquely identifies data for remediating performance associated with future outcomes.

20 Claims, 20 Drawing Sheets

Related U.S. Application Data continuation of application No. 14/788,228, filed on Jun. 30, 2015, which is a continuation-in-part of application No. 14/724,620, filed on May 28, 2015, now Pat. No. 9,288,056, and a continuation-in-part of application No. 14/089,432, filed on Nov. 25, 2013, now Pat. No. 9,412,281, and a continuation-in-part of application No. 14/137,890, filed on Dec. 20, 2013, now Pat. No. 9,406,239, and a continuation-in-part of application No. 14/154,050, filed on Jan. 13, 2014, now abandoned, and a continuation-in-part of application No. 14/524,948, filed on Oct. 27, 2014, now Pat. No. 9,446,314, which is a continuation-in-part of application No. 14/154,050, filed on Jan. 13, 2014, now abandoned, and a continuation-in-part of application No. 14/137,890, filed on Dec. 20, 2013, now Pat. No. 9,406,239, and a continuation-in-part of application No. 14/089,432, filed on Nov. 25, 2013, now Pat. No. 9,412,281, said application No. 14/788,228 is a continuation-in-part of application No. 14/614,279, filed on Feb. 4, 2015, now Pat. No. 9,542,573, which is a continuation of application No. 13/655,507, filed on Oct. 19, 2012, now Pat. No. 8,984,650, said application No. 14/788,228 is a continuation-in-part of application No. 14/144,437, filed on Dec. 30, 2013, now abandoned.

(60) Provisional application No. 61/895,556, filed on Oct. 25, 2013.

(51) Int. Cl.
| | |
|---|---|
| *G06F 16/955* | (2019.01) |
| *H04L 9/32* | (2006.01) |
| *G06Q 20/12* | (2012.01) |
| *G06Q 20/38* | (2012.01) |
| *H04L 29/08* | (2006.01) |

(52) U.S. Cl.
CPC ......... *G06Q 20/123* (2013.01); *G06Q 20/383* (2013.01); *G06Q 20/385* (2013.01); *H04L 9/3271* (2013.01); *H04L 63/0407* (2013.01); *H04L 67/1095* (2013.01); *H04L 2209/60* (2013.01)

(58) Field of Classification Search
USPC ......................................................... 713/150
See application file for complete search history.

(56) References Cited

U.S. PATENT DOCUMENTS

| | | | |
|---|---|---|---|
| 6,148,342 A | 11/2000 | Ho | |
| 6,182,141 B1 | 1/2001 | Blum et al. | |
| 6,401,125 B1 | 6/2002 | Makarios et al. | |
| 6,484,010 B1 | 11/2002 | Sheehan | |
| 6,688,889 B2 | 2/2004 | Wallace et al. | |
| 6,704,787 B1 | 3/2004 | Umbreit et al. | |
| 6,757,742 B1 | 6/2004 | Viswanath | |
| 6,808,392 B1 | 10/2004 | Walton | |
| 6,959,420 B1 | 10/2005 | Mitchell et al. | |
| 7,054,648 B2 | 5/2006 | Abtin et al. | |
| 7,107,447 B2 | 9/2006 | Sanin et al. | |
| 7,123,613 B1 | 10/2006 | Chawla et al. | |
| 7,213,258 B1 | 5/2007 | Kesarwani et al. | |
| 7,370,015 B2 | 5/2008 | Gvily | |
| 7,496,880 B2 * | 2/2009 | Melvin, III | G03F 1/36 716/51 |
| 7,627,810 B2 * | 12/2009 | Glazer | H04L 29/06 715/203 |
| 7,797,726 B2 | 9/2010 | Ashley et al. | |
| 7,844,717 B2 | 11/2010 | Herz et al. | |
| 7,861,307 B2 * | 12/2010 | Dionne | G06F 21/6209 726/26 |
| 7,877,494 B2 | 1/2011 | Carlton et al. | |
| 7,920,050 B2 | 4/2011 | Juels et al. | |
| 7,984,169 B2 | 7/2011 | Brunell et al. | |
| 8,016,680 B1 | 9/2011 | Hutter et al. | |
| 8,033,831 B2 | 10/2011 | Julia et al. | |
| 8,052,426 B2 | 11/2011 | Snyder et al. | |
| 8,073,731 B1 * | 12/2011 | Rajasenan | G06Q 10/0637 705/7.42 |
| 8,135,621 B2 | 3/2012 | Vishik et al. | |
| 8,275,134 B2 | 9/2012 | Wang | |
| 8,316,237 B1 | 11/2012 | Felsher et al. | |
| 8,526,405 B2 | 9/2013 | Curtis et al. | |
| 8,561,185 B1 | 10/2013 | Muthusrinivasan et al. | |
| 8,578,157 B2 | 11/2013 | Pestoni et al. | |
| 8,641,424 B2 | 2/2014 | Soldavini et al. | |
| 8,719,128 B2 * | 5/2014 | Allen | G06Q 20/04 705/14.27 |
| 8,725,536 B2 * | 5/2014 | Deobhakta | G06Q 10/10 705/2 |
| 8,745,372 B2 | 6/2014 | Orsini et al. | |
| 8,753,200 B1 | 6/2014 | Supanc et al. | |
| 8,769,704 B2 * | 7/2014 | Peddada | H04L 63/102 705/59 |
| 8,793,487 B2 * | 7/2014 | Epstein | H04L 9/006 713/157 |
| 8,843,765 B2 * | 9/2014 | Dellow | G06F 21/575 380/44 |
| 8,969,790 B1 | 3/2015 | Alselrod et al. | |
| 8,984,650 B2 | 3/2015 | Hughes et al. | |
| 9,076,021 B2 | 7/2015 | Pittelko | |
| 9,141,823 B2 | 9/2015 | Dawson | |
| 9,288,056 B1 | 3/2016 | Spagnola et al. | |
| 9,406,239 B2 | 8/2016 | Spagnola | |
| 9,412,281 B2 | 8/2016 | Spagnola | |
| 9,446,314 B2 | 9/2016 | Spagnola | |
| 9,516,002 B2 | 12/2016 | O'Hare et al. | |
| 9,542,573 B2 | 1/2017 | Hughes et al. | |
| 9,544,764 B2 * | 1/2017 | Shin | H04W 8/18 |
| 9,690,920 B2 * | 6/2017 | Marcus | G06F 21/33 |
| 2002/0160347 A1 | 10/2002 | Wallace et al. | |
| 2002/0165912 A1 | 11/2002 | Wenocur et al. | |
| 2002/0174364 A1 | 11/2002 | Nordman et al. | |
| 2003/0064354 A1 * | 4/2003 | Lewis | G09B 3/04 434/322 |
| 2003/0080997 A1 | 5/2003 | Fuehren et al. | |
| 2003/0097383 A1 | 5/2003 | Smirnov et al. | |
| 2003/0204445 A1 | 10/2003 | Vishik et al. | |
| 2004/0009461 A1 | 1/2004 | Snyder et al. | |
| 2004/0049687 A1 | 3/2004 | Orsini et al. | |
| 2004/0083229 A1 | 4/2004 | Porter et al. | |
| 2004/0093346 A1 | 5/2004 | Hochman | |
| 2004/0133625 A1 | 7/2004 | Plessmann | |
| 2004/0199782 A1 | 10/2004 | Arnold | |
| 2004/0210770 A1 | 10/2004 | Sanin et al. | |
| 2005/0060221 A1 | 3/2005 | Kolar et al. | |
| 2006/0177061 A1 | 8/2006 | Orsini et al. | |
| 2006/0257841 A1 | 11/2006 | Mangano et al. | |
| 2007/0274489 A1 | 11/2007 | Yamamura et al. | |
| 2007/0292826 A1 | 12/2007 | Goddy et al. | |
| 2008/0040370 A1 | 2/2008 | Bosworth et al. | |
| 2008/0134347 A1 | 6/2008 | Goyal et al. | |
| 2008/0235336 A1 | 9/2008 | Stern et al. | |
| 2009/0075709 A1 | 3/2009 | Park | |
| 2009/0170058 A1 | 7/2009 | Walker et al. | |
| 2009/0197237 A1 | 8/2009 | Couch et al. | |
| 2009/0226872 A1 | 9/2009 | Gunther | |
| 2009/0327297 A1 | 12/2009 | Deobhakta et al. | |
| 2010/0036884 A1 | 2/2010 | Brown | |
| 2010/0143873 A1 | 6/2010 | Keim et al. | |
| 2010/0293598 A1 | 11/2010 | Collart et al. | |
| 2011/0039242 A1 | 2/2011 | Packard et al. | |
| 2011/0072039 A1 | 3/2011 | Tayloe et al. | |
| 2011/0072142 A1 | 3/2011 | Herz et al. | |
| 2011/0099202 A1 | 4/2011 | Dedeoglu et al. | |
| 2011/0177480 A1 | 7/2011 | Menon et al. | |

(56) References Cited

U.S. PATENT DOCUMENTS

| | | |
|---|---|---|
| 2011/0189643 A1 | 8/2011 | Hutchinson et al. |
| 2011/0195389 A1 | 8/2011 | DeYoung et al. |
| 2011/0202755 A1 | 8/2011 | Orsini |
| 2011/0202774 A1 | 8/2011 | Kratsch et al. |
| 2011/0208668 A1 | 8/2011 | Phillips |
| 2011/0255688 A1 | 10/2011 | Spalink et al. |
| 2012/0040326 A1 | 2/2012 | Larson-Rutter et al. |
| 2012/0158514 A1* | 6/2012 | Aldrey ............... G06Q 30/0269 705/14.66 |
| 2012/0210118 A1 | 8/2012 | Chaves |
| 2012/0231438 A1 | 9/2012 | Fakhrai |
| 2013/0014126 A1 | 1/2013 | Zana et al. |
| 2013/0018812 A1 | 1/2013 | Cherner et al. |
| 2013/0111570 A1 | 5/2013 | Kääriäinen et al. |
| 2013/0310166 A1 | 11/2013 | Higgins et al. |
| 2014/0024009 A1 | 1/2014 | Nealon et al. |
| 2014/0115710 A1 | 4/2014 | Hughes et al. |
| 2014/0281491 A1 | 9/2014 | Zaverucha et al. |
| 2014/0304505 A1 | 10/2014 | Dawson |
| 2014/0310729 A1 | 10/2014 | Chaniotakis et al. |
| 2015/0006454 A1 | 1/2015 | Supanc et al. |
| 2015/0066940 A1 | 3/2015 | Fernandes et al. |
| 2015/0119120 A1 | 4/2015 | Spagnola |
| 2015/0147741 A1 | 5/2015 | Spagnola et al. |
| 2015/0150144 A1 | 5/2015 | Hughes et al. |
| 2015/0179078 A1 | 6/2015 | Spagnola |
| 2015/0187223 A1 | 7/2015 | Kapoor et al. |
| 2015/0199909 A1 | 7/2015 | Spagnola |
| 2016/0042198 A1 | 2/2016 | Kapoor et al. |
| 2016/0055410 A1 | 2/2016 | Spagnola |
| 2016/0335537 A1 | 11/2016 | Spagnola |
| 2016/0335538 A1 | 11/2016 | Spagnola |
| 2016/0335539 A1 | 11/2016 | Spagnola |
| 2016/0335541 A1 | 11/2016 | Spagnola |
| 2016/0352730 A1 | 12/2016 | Spagnola |
| 2017/0054689 A1 | 2/2017 | Hughes et al. |

OTHER PUBLICATIONS

Angin, "An Entity-Centric Approach for Privacy and Identity Management in Cloud Computing", IEEE, 2010, pp. 177-183.
Aura, et al., "Scanning Electronic Documents for Personally Identifiable Information" ACM, Oct, 2006, pp. 41-49.
Chakravorty, et al., "Privacy Preserving Data Analytics for Smart Phones", IEEE, 2013, pp. 23-27.
Darbhamulia, et al., "Paving the Way Towards an Efficient Learning Management System", ACM, 2004, pp. 428-433.
Gay, et al., "Adapting Learning Environments with Access for All", ACM, 2009, pp. 90-91.
Heurix, "Pseudonymization with metadata encryption for privacy-preserving searchable documents", System Science (HICSS), 2012 45th Hawaii International Conference, 2012, pp. 3011-3020.
Hu, "Privacy-Preserving WebID Analytics on the Decentralized Policy-Aware Social Web", ACM, Aug, 2014, pp. 503-510.
Muller, et al., "Secure Business Processes in Service-Oriented Architectures—a Requirements Analysis", IEEE, 2010, pp. 35-42.
Neubauer, et al., "A methodology for the pseudonymization of medical data.", Int J Med Inform., vol. 80, No. 3, Mar. 2011, pp. 190-204.
Noumeir, et al., "Pseudonymization of radiology data for research purposes.", J Digit Imaging., vol. 20, No. 3, Sep. 2007, pp. 284-295.
Schneier, "Applied Cryptography", Wiley, 1996, pp. 1-2.
Quantiles.com; The Quantile Framework for Mathematics; Feb. 18, 2006. [online], retrieved on Feb. 9, 2014]. Retrieved from the Wayback Machine, archive.org https://web.archive.org/web/20060218165157/http://www.quantiles.com/EntrancePageFlash.html?1.
First Action Interview Pilot Program Pre-Interview Communication for U.S. Appl. No. 15/017,408, dated May 6, 2016, 4 pages.
Advisory Action for U.S. Appl. No. 14/154,050, dated Mar. 29, 2016, 3 pages.
Non-Final Office Action for U.S. Appl. No. 15/345,374, dated Apr. 24, 2017, 10 pages.
Final Office Action for U.S. Appl. No. 13/655,507, dated Jun. 13, 2014, 30 pages.
Non-Final Office Action for U.S. Appl. No. 13/655,507, dated Dec. 19, 2013, 24 pages.
Notice of Allowance for U.S. Appl. No. 13/655,507, dated Nov. 7, 2014, 11 pages.
Advisory Action for U.S. Appl. No. 14/089,432, dated Apr. 19, 2016, 3 pages.
Final Office Action for U.S. Appl. No. 14/089,432, dated Dec. 19, 2014, 5 pages.
Final Office Action for U.S. Appl. No. 14/089,432, dated Feb. 11, 2016, 9 pages.
Non-Final Office Action for U.S. Appl. No. 14/089,432, dated Jul. 22, 2014, 6 pages.
Non-Final Office Action for U.S. Appl. No. 14/089,432, dated Feb. 13, 2014, 11 pages.
Non-Final Office Action for U.S. Appl. No. 14/089,432, dated Jul. 1, 2015, 8 pages.
Notice of Allowance for U.S. Appl. No. 14/089,432, dated Jun. 21, 2016, 5 pages.
Notice of Allowance for U.S. Appl. No. 14/103,576, dated Feb. 7, 2014, 9 pages.
Advisory Action for U.S. Appl. No. 14/137,890, dated Apr. 19, 2016, 3 pages.
Final Office Action for U.S. Appl. No. 14/137,890, dated Jan. 2, 2015, 6 pages.
Final Office Action for U.S. Appl. No. 14/137,890, dated Feb. 8, 2016, 9 pages.
Non-Final Office Action for U.S. Appl. No. 14/137,890, dated Aug. 8, 2014, 5 pages.
Non-Final Office Action for U.S. Appl. No. 14/137,890, dated Jun. 19, 2015, 8 pages.
Notice of Allowance for U.S. Appl. No. 14/137,890, dated May 28, 2014, 15 pages.
Notice of Allowance for U.S. Appl. No. 14/137,890, dated Jun. 22, 2016, 8 pages.
Final Office Action for U.S. Appl. No. 14/144,437, dated May 13, 2015, 7 pages.
First Action Interview Office Action Summary for U.S. Appl. No. 14/144,437, dated Sep. 5, 2014, 3 pages.
Final Office Action for U.S. Appl. No. 14/154,050, dated Mar. 12, 2015, 15 pages.
Final Office Action for U.S. Appl. No. 14/154,050, dated Jan. 13, 2016, 8 pages.
First Action Interview Office Action Summary for U.S. Appl. No. 14/154,050, dated Nov. 10, 2014, 6 pages.
Non-Final Office Action for U.S. Appl. No. 14/154,050, dated Jul. 27, 2015, 6 pages.
First Action Interview Pilot Program Pre-Interview Communication for U.S. Appl. No. 14/154,050, dated Sep. 23, 2014, 8 pages.
Final Office Action for U.S. Appl. No. 14/524,948, dated Dec. 10, 2015, 7 pages.
Non-Final Office Action for U.S. Appl. No. 14/524,948, dated May 19, 2015, 15 pages.
Notice of Allowance for U.S. Appl. No. 14/524,948, dated May 13, 2016, 7 pages.
Notice of Allowance for U.S. Appl. No. 14/614,279, dated Aug. 25, 2016, 9 pages.
Notice of Allowance for U.S. Appl. No. 14/724,620, dated Nov. 6, 2015, 20 pages.
First Action Interview Office Action Summary for U.S. Appl. No. 14/754,337, dated Dec. 15, 2015. 6 pages.
Notice of Allowance for U.S. Appl. No. 14/754,337, dated Apr. 29, 2016, 12 pages.
Advisory Action for U.S. Appl. No. 14/788,228, dated Feb. 16, 2017, 8 pages.
Final Office Action for U.S. Appl. No. 14/788,228, dated Nov. 23, 2016, 17 pages.
Final Office Action for U.S. Appl. No. 14/788,228, dated Feb. 19, 2016, 41 pages.

(56) References Cited

OTHER PUBLICATIONS

First Action Interview Office Action Summary for U.S. Appl. No. 14/788,228, dated Oct. 29, 2015, 5 pages.
First Action Interview Pilot Program Pre-Interview Communication Summary for U.S. Appl. No. 14/788,228, dated Sep. 3, 2015, 23 pages.
Non-Final Office Action for U.S. Appl. No. 14/788,228, dated Jul. 14, 2016, 28 pages.
First Action Interview Office Action Summary for U.S. Appl. No. 15/017,408, dated Jul. 26, 2016, 4 pages.
Notice of Allowance for U.S. Appl. No. 15/017,408, dated Jan. 5, 2017, 18 pages.
Applicant-Initiated Interview Summary for U.S. Appl. No. 15/345,374, dated Oct. 29, 2015, 10 pages.

* cited by examiner

670

| Test Content Data Store ||
| --- | --- |
| Description | Identifier |
| Instruction Memory | 1 |
| Registers | 2 |
| Arithmetic Logic Unit (ALU) | 3 |
| Data Memory | 4 |

| Test Content Data Store ||
| --- | --- |
| Description | Identifier |
| Instruction Memory – Low | A |
| Instruction Memory – Medium | B |
| Instruction Memory – High | C |
| Registers – Low | D |
| Registers – Medium | E |
| Registers – High | F |
| ALU - Low | A |
| ALU - Medium | B |
| ALU - High | C |
| Data Memory - Low | D |

| Test Content Data Store | |
|---|---|
| Description | Identifier |
| ALU – AND Gate | TA |
| ALU – OR gate | GR |
| ALU - Inverter | EE |
| ALU – Multiplexor | 9P |

| Test Content Data Store | |
|---|---|
| Description | Identifier |
| ALU – AND Gate – 10% | 42 |
| ALU – AND Gate – 20% | 01 |
| ALU – AND Gate – 30% | AD |
| ALU – AND Gate – 40% | ZX |
| ALU – AND Gate – 50% | QB |
| ALU – AND Gate – 60% | MN |
| ALU – AND Gate – 70% | FI |
| ALU – AND Gate – 80% | RC |
| ALU – AND Gate – 90% | BC |
| ALU – AND Gate – 100% | 8G |

FIG. 11B

DEIDENTIFIED ACCESS OF CONTENT

CROSS-REFERENCES TO RELATED APPLICATIONS

This application is a continuation of U.S. application Ser. No. 15/456,018, filed on Mar. 10, 2017, which is a continuation of U.S. application Ser. No. 14/788,228, filed on Jun. 30, 2015, which is a continuation-in-part of U.S. application Ser. No. 14/724,620, filed on May 28, 2015. U.S. application Ser. No. 14/788,288 is a continuation-in-part of U.S. application Ser. No. 14/089,432, filed on Nov. 25, 2013. U.S. application Ser. No. 14/788,288 is a continuation-in-part of U.S. application Ser. No. 14/137,890, filed on Dec. 20, 2013. U.S. application Ser. No. 14/788,288 is a continuation-in-part of U.S. application Ser. No. 14/154,050, filed on Jan. 13, 2014. U.S. application Ser. No. 14/788,288 is a continuation-in-part of U.S. application Ser. No. 14/524,948, filed on Oct. 27, 2014, which is a continuation-in-part of U.S. application Ser. No. 14/154,050, filed on Jan. 13, 2014, and which is a continuation-in-part of U.S. application Ser. No. 14/137,890, filed on Dec. 20, 2013, and which is a continuation-in-part of U.S. application Ser. No. 14/089,432, filed on Nov. 25, 2013, and which claims the benefit of U.S. Provisional Application No. 61/895,556 filed on Oct. 25, 2013. U.S. application Ser. No. 14/788,288 is a continuation-in-part of U.S. application Ser. No. 14/614,279, filed on Feb. 4, 2015, which is a continuation of U.S. application Ser. No. 13/655,507, filed on Oct. 19, 2012. U.S. application Ser. No. 14/788,288 is a continuation-in-part of U.S. application Ser. No. 14/144,437, filed on Dec. 30, 2013. The entire disclosures of the above applications are hereby incorporated by reference, for all purposes, as if fully set forth herein.

BACKGROUND

Fraudulently accessing data is possible through various means. For example, data may be transmitted to a recipient and intercepted. When the source or content of the data is sensitive, it would be beneficial to secure or encode the data to hide the source or content of the data.

BRIEF DESCRIPTION OF THE DRAWINGS

FIGS. 10A-10B and 11A-11B illustrate examples of data that are stored in the test content data store, according to at least one example;

Figure 1:
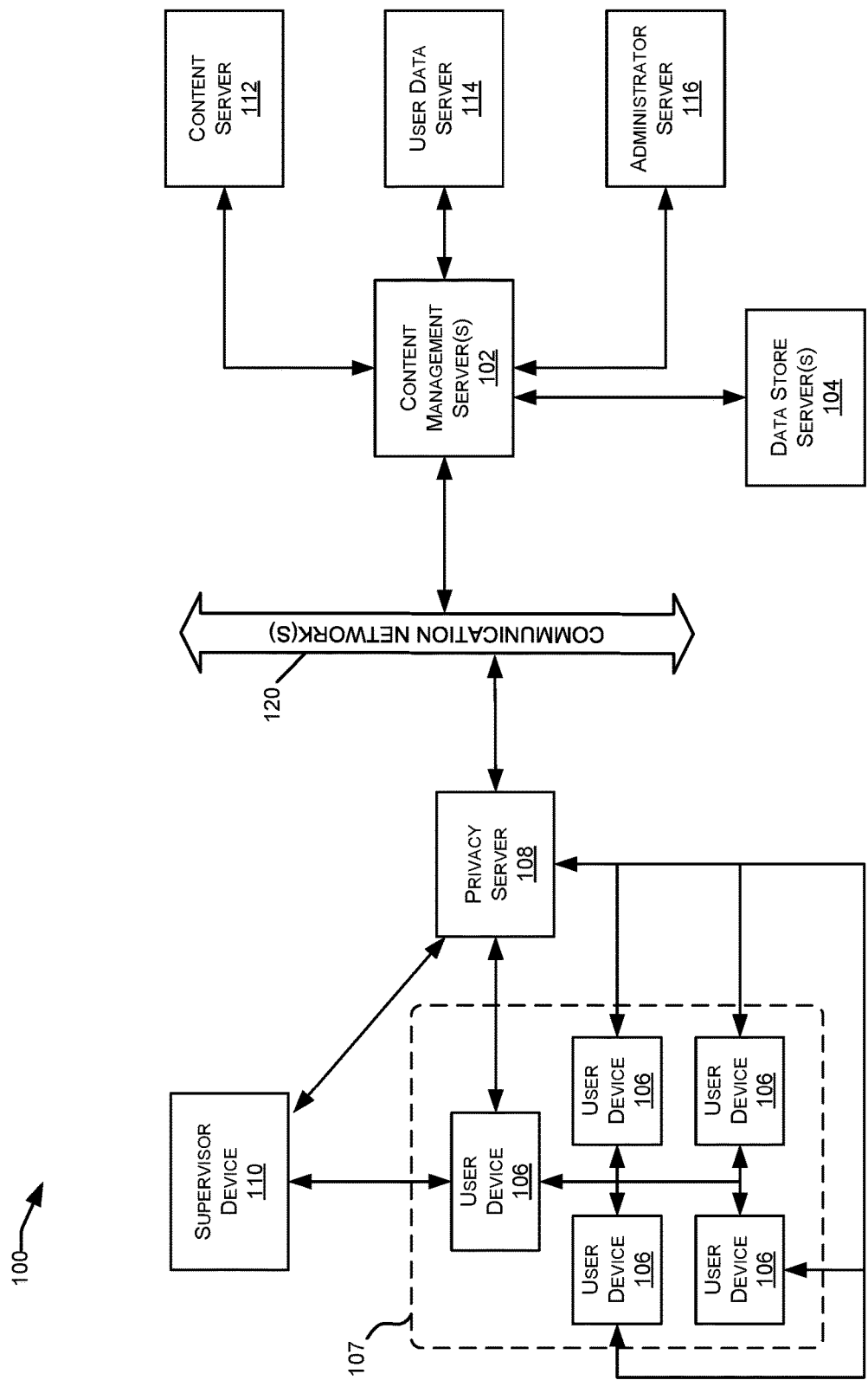
FIG. 1 is a block diagram showing illustrating an example of a content distribution network.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

The present disclosure provides a content distribution network for accessing deidentified content. This content distribution network includes, for example, an evaluation system. The evaluation system may be configured to transmit, to a user device, a first test strand and a second test strand and receive, from the user device, one or more responses to the first test strand and the second test strand. The content distribution network may also include a data engine that executes a key. The execution can cause a comparison of the key with the one or more responses to the first test strand and the second test strand and a determination of a first outcome for the first test strand, based in part on the comparison of the key with the one or more responses. The execution can also cause a determination of a second outcome for the second test strand, based in part on the comparison of the key with the one or more responses. The content distribution network may also include an identifier engine that generates an identifier. The identifier may uniquely indicate the first outcome and the second outcome. Coding of the identifier may obscure unaided human interpretation of the first outcome and the second outcome, and the identifier may identify data for remediating performance on the first test strand or the second test strand. The content distribution network may also include a network interface controller (NIC) that transmits the identifier to the user device.

In some embodiments, the present disclosure provides a method for accessing deidentified content. This method includes, for example, transmitting, to a user device using a content distribution network, a first test strand and a second test strand and receiving, from the user device, one or more responses to the first test strand and the second test strand. The method also includes executing a key with the one or more responses to the first test strand and the second test strand. The execution may comprise a determination of a first outcome for the first test strand, based in part on the comparison of the key with the one or more responses, and a determination of a second outcome for the second test strand, based in part on the comparison of the key with the one or more responses. The method also includes generating an identifier. The identifier may uniquely indicate the first outcome and the second outcome. Coding of the identifier may obscure unaided human interpretation of the first outcome and the second outcome, and the identifier may identify data for remediating performance on the first test strand or the second test strand. The method also includes transmitting the identifier to the user device.

In some embodiments, the present disclosure provides an evaluation system that comprises a network interface controller (NIC), a data store, a processor, and a memory comprising computer executable instructions which when executed by the processor cause the processor to perform the method receiving, by the evaluation system using the network interface controller (NIC) of the evaluation system from a user device, an identifier. The evaluation system and the user device communicate within a content distribution network. The identifier is associated with a first test strand and a second test strand, the identifier is generated by concatenating: a first identifier portion that identifies the first test strand with a first score identifier portion that identifies a first outcome with a second identifier portion that identifies the second test strand with a second score identifier portion that identifies a second outcome; and wherein the identifier: uniquely indicates the first outcome and the second outcome, coding of the identifier obscures unaided human interpretation of the first outcome and the second outcome, and the identifier identifies data for remediating performance on the first test strand or the second test strand. The identifier may be parsed to identify remediate data. For example, parsing the identifier may determine the first identifier portion and the first score identifier portion. The method may comprise identifying first remediate data in association with the first identifier portion and the first score identifier portion, where the first remediate data corresponds with the first outcome of the first test strand. The method may comprise parsing the identifier to determine the second identifier portion and the second score identifier portion. The method may comprise identifying second remediate data with the second identifier portion and the second score identifier portion, where the second remediate data corresponds with the second outcome of the second test strand. The method may also comprise transmitting, by the network interface controller (NIC), the first remediate data or the second remediate data to the user device to display the first remediate data or the second remediate data at the user device, where the user device is enabled to display the first remediate data or the second remediate data.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, or games.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
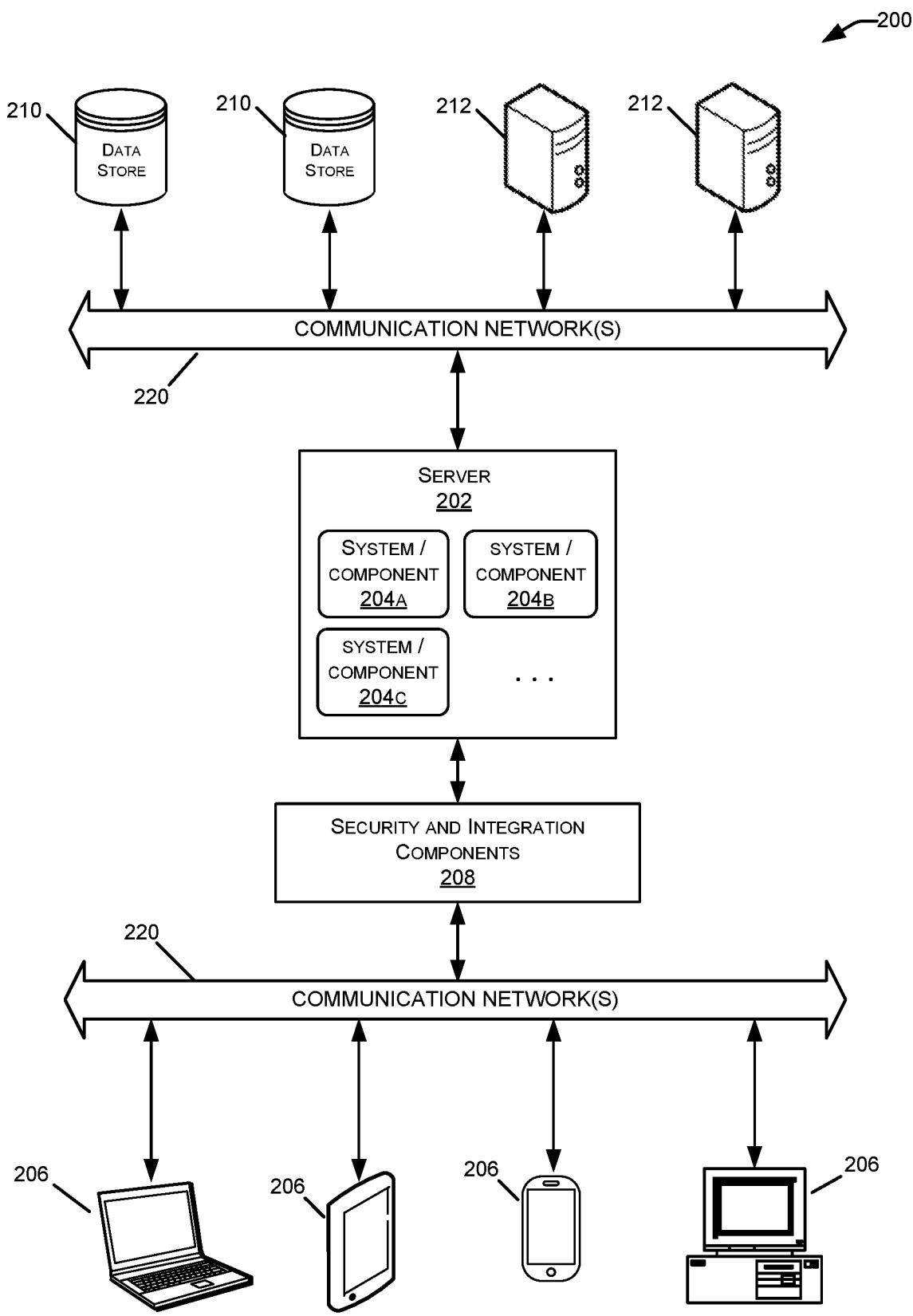
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
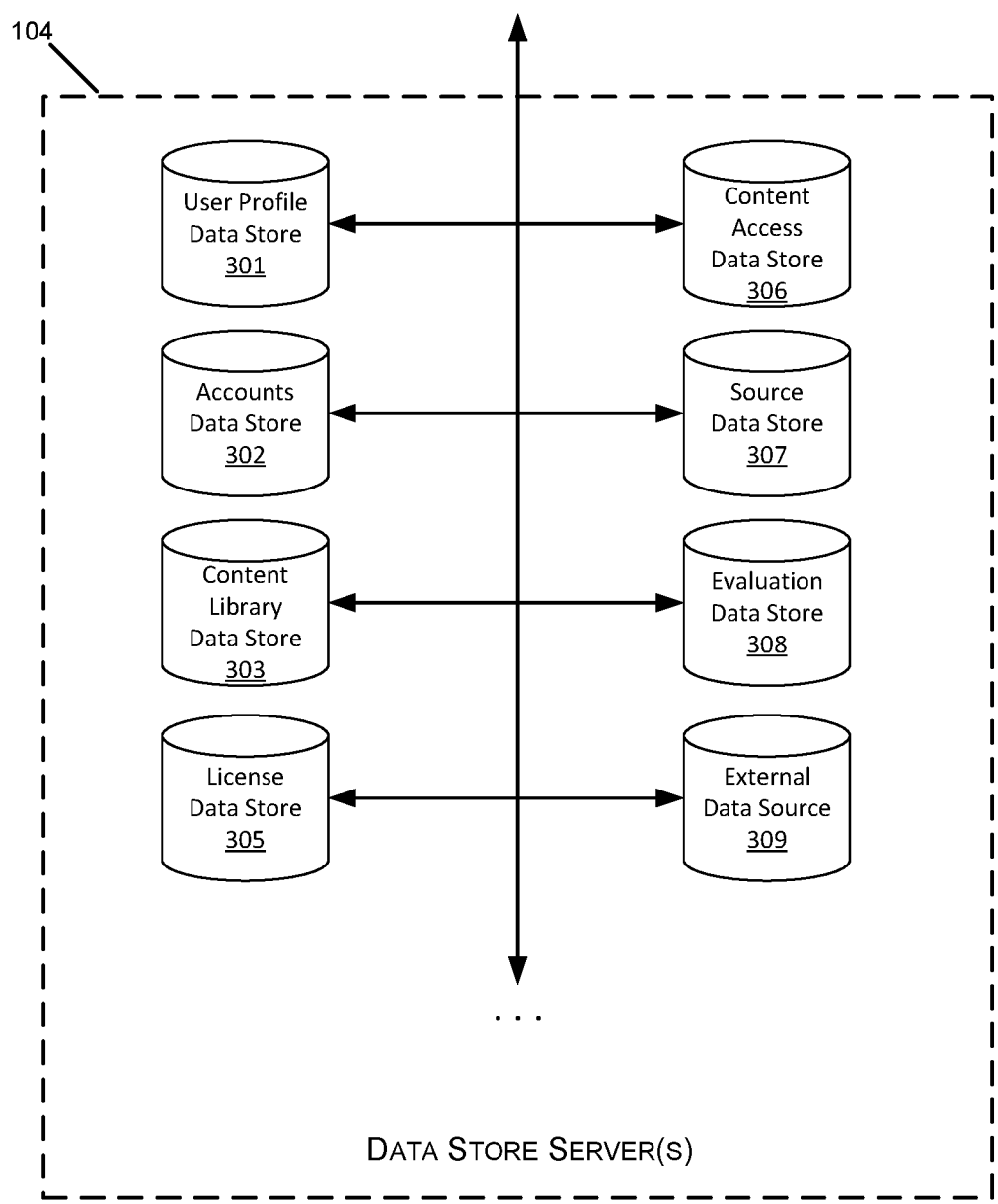
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, network usage statistics, etc.

A user profile data store 301 may include information relating to the end users within the content distribution network 100. This information may include user characteristics such as the user names, access credentials (e.g., login and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content users, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, user data, health related data, and the like. Illustrative external data aggregators 309 may include, for example, networking web servers, public records data stores, learning management systems, educational institution servers, business servers, medical record data stores, etc. Data retrieved from various external data aggregators 309 may be used to verify and update user account information, suggest user content, and perform user and content evaluations.

Figure 4:
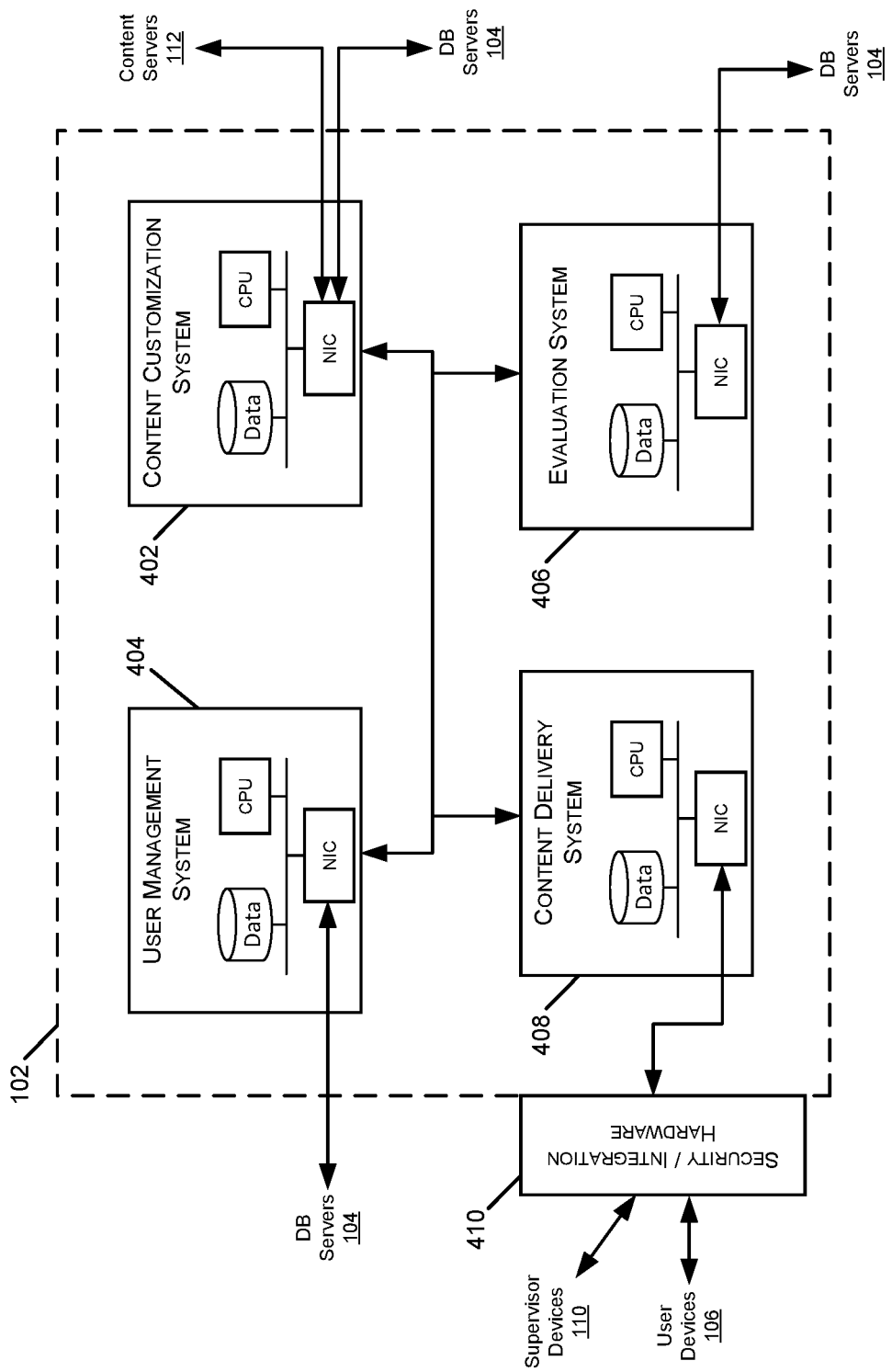
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
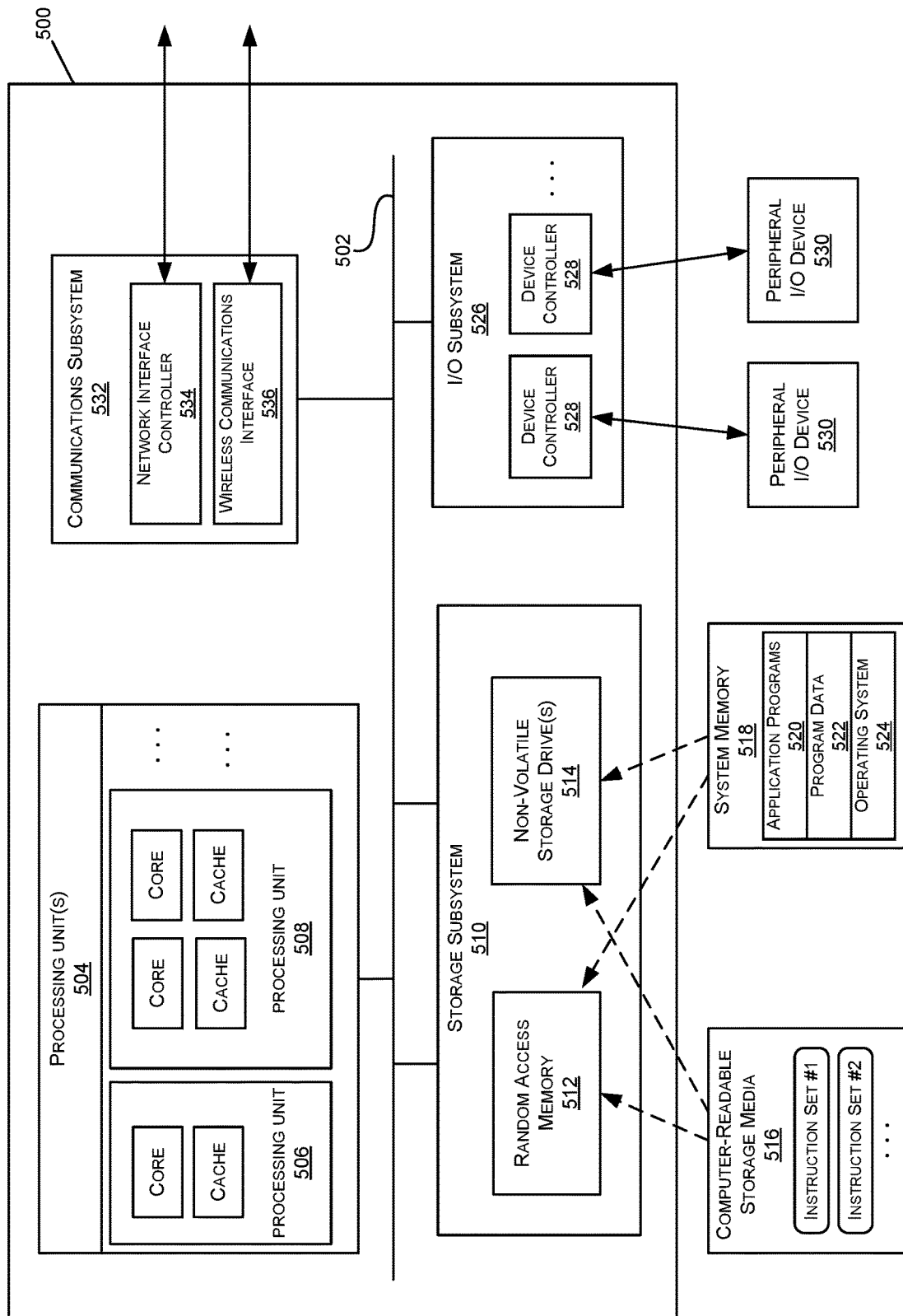
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

This application incorporates by reference the entirety of U.S. patent application Ser. No. 14/788,228, filed Jun. 30, 2015. This application also incorporates by reference the entirety of U.S. patent application Ser. Nos. 14/724,620, 14/614,279, 14/524,948, 14/154,050, 14/144,437, 14/137,890, 14/089,432, 13/655,507, 61/895,556, and 14/754,337.

Figure 6:
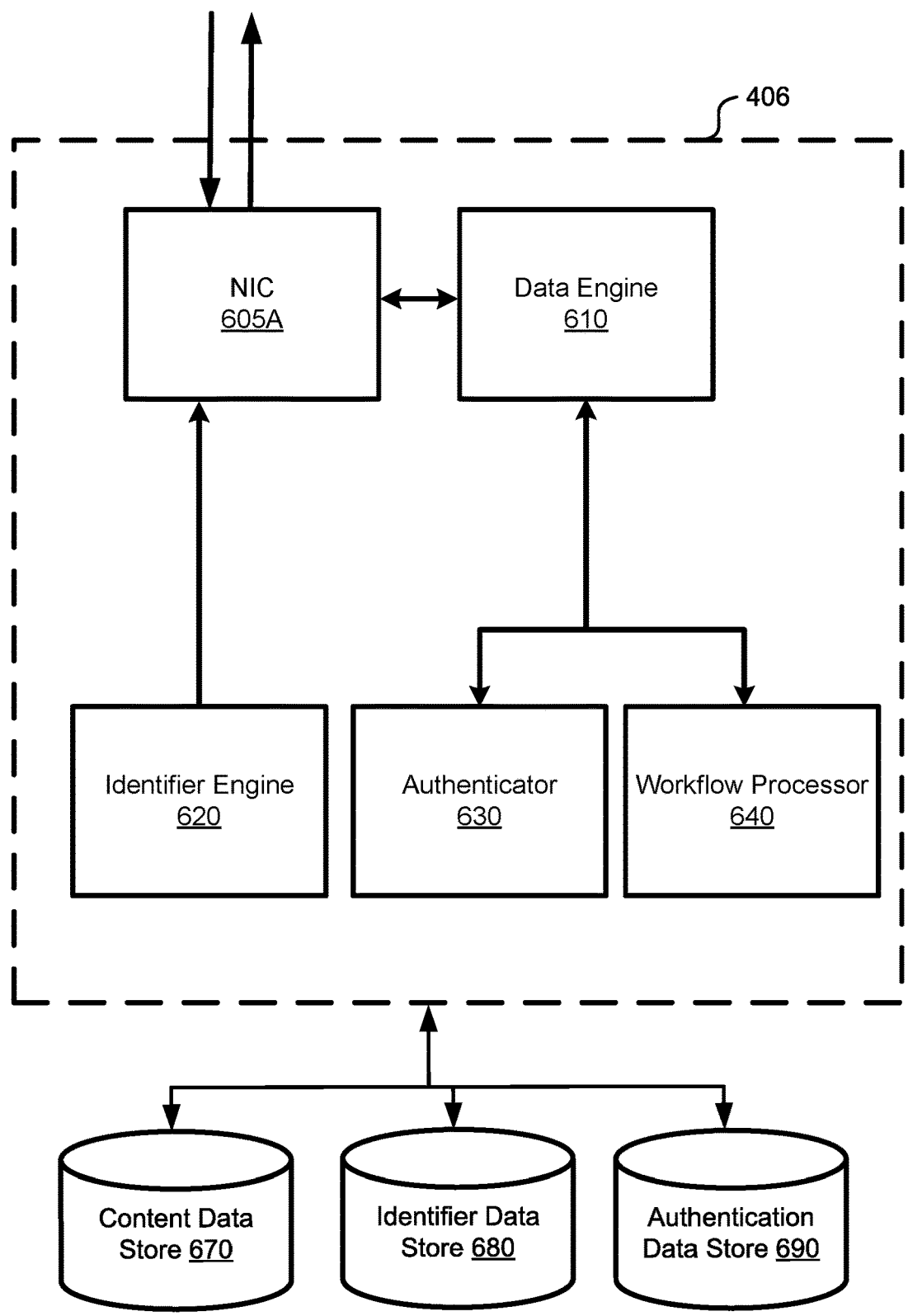
FIG. 6 illustrates an example architecture of an evaluation system that communicates with one or more data stores, according to at least one example.

With reference now to FIG. 6, a block diagram of an illustrative computer system is shown. The system may correspond with the evaluation system 406 of the content distribution network 100 within a shared content management server 102 described above, or any other computing devices described herein. In this example, evaluation system 406 includes processing units that include, for example, a data engine 610, an identifier engine 620, an authenticator 630, and a workflow processor 640 communicate with one or more data stores, including a content data store 670, identifier data store 680, and authentication data store 690.

The evaluation system 406 includes one or more network interface controllers (NIC) (illustrated as NIC 605A, hereinafter "NIC 605") which can allow devices, networks, and other systems to access the other components of the system 100. The NIC 605 includes features configured to send and receive information, including, for example, an antenna, a modem, a transmitter, receiver, or any other feature that can send and receive information. The NIC 605 can communicate via telephone, cable, fiber-optic, and other wired communication network. In some embodiments, the NIC 605 communicates via cellular networks, WLAN (wireless local area networking) networks, or any other wireless network.

The NIC 605 can also be configured to send and receive data. In some embodiments, the NIC 605 transmits a test to a user device, transmits a plurality of test strands to a user device, receives test answers that correspond to the strands of the test, or receives correct answers in a key. For example, the user device 106 provides test answers that correspond to the strands of the test, which are received via the NIC 605.

The evaluation system 406 also includes a data engine 610. The data engine 610 can be configured to identify data associated with a test. The data may include one or more test questions, answers to test questions, remediate code, instructional content, or other data that can help diagnose the performance of a user. The user may include a student or any other individual or user device that interacts with the test. The test may include a plurality of strands, including a first strand and second strand. The strands of the test may include one or more subjects, including algebra, arithmetic, reading comprehension, sentence skills, or other subjects. In some embodiments, the strands of the test are provided in other formats, including difficulty levels (e.g., one strand is low difficulty, one strand is high difficulty), test types (e.g., logic, reading, games), nested sets of questions (e.g., one prompt for seven questions), and timeframes (e.g., one strand corresponds to one hour or day, a second strand corresponds to a different hour or day). In some examples, the strands of the test can represent particular strands or portions of the test. For example, when the test includes algebra problems, the strands or portions of the test include word problems, computation with decimals, main ideas, or other strands or portions.

The data engine 610 can also be configured to receive and/or identify a key. The key may include a set of correct answers for a particular test, including a first strand of correct answers and a second strand of correct answers. For example, the data engine 610 receives a plurality of test answers to a plurality of test strands in a test and the plurality of test answers correspond with the user interacting with the test. The plurality of test answers can include a first set of test answers and a second set of test answers, such that the first set of test answers corresponds to the first strand of the test, and the second set of test answers corresponds to the second strand of the test.

The data engine 610 can also be configured to identify a plurality of correct answers in the key, including a first strand of correct answers and a second strand of correct answers. The correct answers in the key may correspond with various strands of the test. For example, the first strand of correct answers corresponds with the first strand of the test and the second strand of correct answers corresponds with the second strand of the test. In another example, the correct answers may include "C" for question 1, "D" for question 2, and "No" for question 3.

The data engine 610 can also be configured to compare the test answers from the user with strands of correct answers. For example, the test answers from the student may include "A" for question 1, "C" for question 2, and "Yes" for question 3. The correct answers from the key may include "C" for question 1, "D" for question 2, and "No" for question 3. In this instance, the data engine 610 determines that the student scored "0," received 0% correct or 100% incorrect, or any other method of grading the test answers in comparison with the correct answers.

The data engine 610 can also be configured to determine an outcome for a particular strand of the test. For example, the determination includes a first outcome on the first strand of the test based in part on the comparison of the first set of test answers. The first outcome can identify one or more correct responses provided in the first strand of the test (e.g., 50% correct, answers 4 and 5 are correct). In another example, the determination includes a second outcome on the second strand of the test based in part on the comparison of the second set of test answers.

The evaluation system 406 also includes an identifier engine 620. The identifier engine 620 can be configured to generate an identifier associated with the user of the test. The identifier can include one or more alphanumeric characters, including alphabetic characters, digits, and/or symbols that are associated with data, remediation levels, one or more outcomes associated with strands of the test, one or more users associated with the identifier, strands of the test, check portion (e.g., digit), access credentials, or other information. For example, when an identifier is "1AGCJ-5ABEFH-6," the identifier identifies two strands of the test (e.g., 1 for arithmetic and 5 for general math, 1 for word problems and 5 for computation with decimals, 1 for one stand of a test and 5 for a different strand of a test), a plurality of remediation levels (e.g., "A" for a low score in the fractions strand of arithmetic, "G" for a medium score in the division strand of arithmetic, "C" for a low score in the percentages strand of arithmetic), and a check portion (e.g., by translating the identifier to a numeric value to help confirm that the identifier was provided correctly to a remediation server or webpage).

In some embodiments, the identifier uniquely indicates the first outcome of the first strand of the test and the second outcome of the second strand of the test. The outcome identifies one or more correct responses provided in a particular strand of the test. For example, the outcome includes a "low" score in the fractions strand of the test, a "medium" score in the division strand of arithmetic strand of the test, and a "low" score in the percentages strand of test. In another example, the outcome includes 50% correct or answers 4 and 5 are correct.

The identifier can uniquely indicate the outcome by including identifier portion(s) with the identifier. For example, an identifier of "1AGCJ" incorporates five identifier portions, including "1," "A," "G," "C," and "J," where each character, digit, or symbol is an identifier portion. In another example, an identifier of "1A-2J" incorporates two identifier portions, including "A" and "J," where "A" indicates a low score on the fractions strand of the arithmetic strand (e.g., "1") and "J" indicates a low score on the main concepts strand of the reading comprehension strand (e.g., "2"). In another example, an identifier of "1A-2J" incorporates two identifier portions, including "A" and "J," where "A" indicates a low score on the fractions strand, portion, or strand of algebra (e.g., "1") and "J" indicates a low score on the main concepts strand, portion, or strand of reading comprehension (e.g., "2").

In some embodiments, the coding of the identifier obscures unaided human interpretation of the first outcome and the second outcome. Obscuring unaided human interpretation may code the identifier so that it is impossible for a human to decode or interpret the identifier or data associated with the identifier without a computer. Human interpretation may include a user's ability to read the identifier and deduce which data will be provided to the user, based in part on a remediation level and/or remediation content associated with the identifier. In some instances, human interpretation may be aided by the use of a computer, server, or user device used to translate the identifier. For example, a computer can calculate a complex mathematics problem, whereas the human interpretation of the same mathematics problem would take more time or be unsolvable for the human. The human can use a computer to help solve the mathematics problem. In another example, a computer can easily see a pattern in a coded identifier (e.g., "OLLEH" is "HELLO" backwards), whereas the human interpretation of the pattern may take more time or be unsolvable. In some embodiments, unaided human interpretation will not include these computers, servers, or user devices.

In some embodiments, the identifier uniquely identifies remediate data for remediating performance on the test. For example, the identifier includes "2B" which indicates the user performed poorly on the sentence structure portion of the reading comprehension strand of the test. Based in part on the "poor" performance identified by the identifier, the data for remediating performance on the test can include lectures, instructional videos, tutorials, question/answer portions, step-by-step instructions, supplemental learning material, references to books or instructions in content, or other information to help remediate performance on the test. In some examples, the user will review and/or practice performing problems from a particular strand using the data. The user can improve performance on future tests by interacting with the data provided for the one or more strands.

The identifier engine 620 can also be configured to transmit the identifier. In some embodiments, the identifier is transmitted to a user device to enable the user device to access data associated with the test. The identifier engine 620 can interact with the NIC 605 to transmit the identifier to the user device 106.

The identifier engine 620 can also be configured to encrypt and/or decrypt the identifier. The identifier may be encrypted before the identifier is transmitted. For example, the identifier engine 620 may generate an identifier and alter the identifier to form an encrypted identifier. Details and features of one type of encryption process are provided in association with FIG. 12.

The evaluation system 406 also includes an authenticator 630. The authenticator 630 can be configured to identify a user and/or a user device. For example, the authenticator 630 identifies the user associated with the user device as John Smith in a Colorado high school in Grade 12. The user can attend the test through a distance learning environment. The authenticator 630 may also identify the type of user device operated by the user (e.g., mobile device, tablet, desktop computer) and/or alter data based in part on the identification of the user and/or user device. For example, when the user is identified as an English-speaker, the data is provided in English. In another example, when the user is identified as operating a mobile device, the data is provided for a smaller screen than when the user device is identified as a desktop computer.

The authenticator 630 can also be configured to interact with the authentication data store 690. For example, the authenticator 630 identifies the name, user name, student identifier, user device identifier, user device type, or other information associated with a user. The authenticator 630 can interact with the authentication data store 690 to store the information. The authenticator 630 may also retrieve the data for future uses and/or to process analytics.

The evaluation system 406 also includes an workflow processor 640. The analytics engine can be configured to display the results of a test. For example, the results of the test provide the user with a summary of the test answers, correct answers, information about the test (e.g., date, title of the test, time allotted to take the test, test provider), or any subsequent steps that the user can consider to improve performance (e.g., by reviewing the data).

The workflow processor 640 can also be configured to generate data that identifies the performance of the user. The data can include various types of information. For example, the data includes at least one psychographic illustration depicting the performance of the user. In another example, the data includes at least one human-readable description associated with the performance of the user. The workflow processor 640 can also be configured to transmit and/or display the data. For example, the data is displayed via a network page, presented using audio/visual information, or other formats for providing data. Details and features of data is provided in association with FIG. 14.

The evaluation system 406 also interacts with one or more data stores, including a content data store 670, identifier data store 680, and authentication data store 690. The data stores are associated with a distributed or local data system accessible by the evaluation system 406.

The content data store 670 may be configured to store information related to tests, including test questions. For example, a test question that includes an algebraic test strand in a test can include: "_+22=30." In another example, a test question that includes an algebraic test strand in a test can include: "A person has 10 apples in his fruit basket, but needs 32 apples. How many apples should the person get from the store?" Details and features of a sample test is provided in association with FIG. 7.

The content data store 670 may also be configured to store points or weighted values that correlate with the test questions or the strand of the test. For example, when the first question incorporates several algebraic concepts in one question and the second question incorporates only one elementary concept in one question, the first question may be harder than the second question. The content data store 670 can associate 2 points for the first question and 1 point for the second question.

In one embodiment, for example, the content data store 670 receives a plurality of test strands from an administrator or test publisher that include one or more test questions in each strand. The questions, strands, origin of the information, upload date, or other information may be stored in the content data store 670 to help create and/or analyze the test.

The identifier data store 680 is configured to store information related to the identifier. For example, the identifier data store 680 stores the identifier (e.g., for future use, as a back-up to providing the identifier to the user device). In some examples, the identifier data store 680 also identifies a user and/or user device associated with an identifier.

The identifier data store 680 may also be configured to store data associated with remediating performance identified by the identifier. For example, when the identifier includes an identifier portion "2B," which indicates the user performed poorly on a strand of the test, the data may be stored in the identifier data store 680 to correlate with that identifier and/or identifier portion. In another example, the identifier data store may include references to the data stored in another location (e.g., text file, webpage, instructional content data store).

The authentication data store 690 stores information related to a user or user device. For example, the authentication data store 690 stores a credential, authentication identifier, device identifier, user identifier, identifier associated with the user of a test, user name, or other information that allows the user of the device to access, manage, receive, generate, or otherwise interact with the test and/or data. The authentication data store 690 may also store a user's test answers, access code, or other information provided by the user to access the test and/or data.

Figure 7:
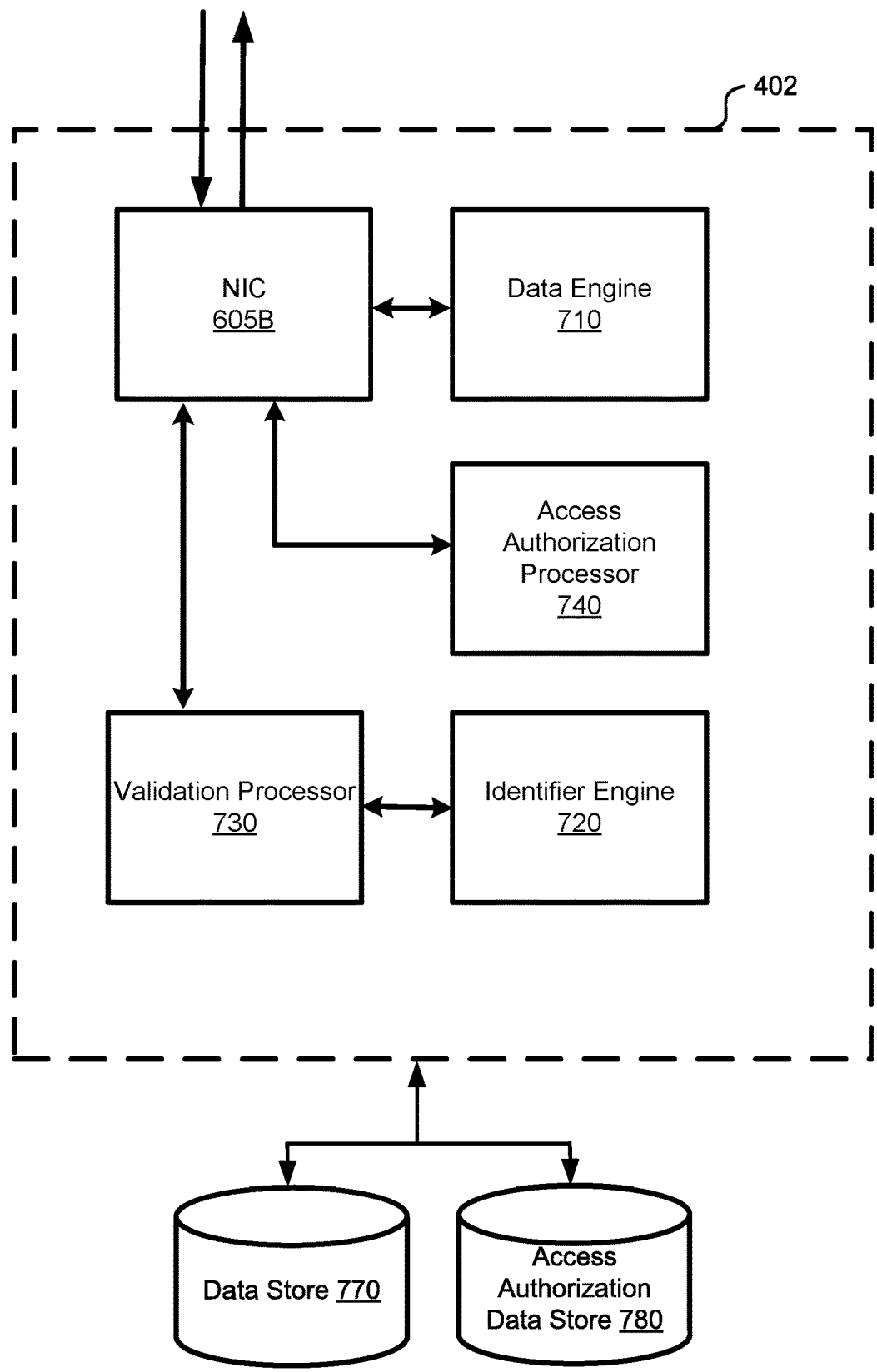
FIG. 7 illustrates an example architecture of a content customization system with one or more data stores, according to at least one example.

With reference now to FIG. 7, a block diagram of an illustrative computer system is shown. The system may correspond with the content customization system 402 of the content distribution network 100 within a shared content management server 102 described above, or any other computing devices described herein. In this example, content customization system 402 includes processing units that include, for example, an instructional data engine 710, identifier engine 720, validation processor 730, access authorization processor 740, and communicate with one or more data stores, including an data store 770 and access authorization data store 780.

As depicted in FIG. 7, the content customization system 402 includes a network interface controller (NIC) 605 (herein shown as NIC 605B). The NIC 605 allows the devices, networks, and other systems to access the other components of the system 100. The NIC 605 includes features configured to send and receive information, including, for example, an antenna, a modem, a transmitter, receiver, or any other feature that can send and receive information. The NIC 605 can communicate via telephone, cable, fiber-optic, and other wired communication network. In some embodiments, the NIC 605 communicates via cellular networks, WLAN (wireless local area networking) networks, or any other wireless network.

The NIC 605 can also be configured to send and receive data. In some embodiments, the NIC 605 receives an identifier associated with a user of a test, receives data, transmits one or more strands of data, or receives a key (e.g., to identify remediation levels in an identifier, to identify a secret for decrypting an encrypted identifier). For example, the NIC 605 transmits the data to a user device 106 that corresponds to the strands of the test.

The content customization system 402 also includes a data engine 710. The data engine 710 can be configured to determine data corresponding with a test. As shown, the test can diagnose the performance of a user. The test can include a first strand of the test and a second strand of the test, and the plurality of data can include a first strand of data and a second strand of data. The data can include one or more questions directed to improving the performance of the user (e.g., on a test).

The data engine 710 can also be configured to determine data in association with the level of remediation. For example, a first strand of data is determined in association with a first level of remediation, so that the first strand of data helps to remediate performance on the first strand of the test. In another example, a second strand of data is determined in association with the second level of remediation, so that the second strand of data is identified for remediating performance on the second strand of the test.

The data engine 710 can also be configured to display the data. In some embodiments, the data may be transmitted to a user device to enable the user remediate performance on a test. The data engine 710 interacts with the NIC 605 to transmit the data to a user device 106.

The data engine 710 can also be configured to interact with the data store 770. For example, when the data engine 710 identifies one or more strands of data, the data engine 710 interacts with the data store 770 to store the information. The data engine 710 may retrieve the data for future uses and/or to process analytics.

The content customization system 402 also includes an identifier engine 720. The identifier engine 720 can be configured to receive an identifier associated with the user of the test. As shown, the identifier may be associated with a user of a test. The identifier can also uniquely indicate one or more outcomes of the test. The coding of the identifier can also obscure unaided human interpretation of the one or more outcomes. The identifier may also uniquely identify the plurality of data for remediating performance on the test.

For example, the identifier engine 720 is configured to identify "A" as a low score in the fractions strand of arithmetic and "G" as a medium score in the division strand of arithmetic. In another example, the identifier engine 720 is configured to identify "TA" as a low score in the fractions strand of arithmetic and "GR" as a medium score in the division strand of arithmetic. The identifier engine 720 can be configured to identify a single character, digit, or symbol as an identifier portion, or identify one or more characters, digits, or symbols as an identifier portion.

The identifier engine 720 can also be configured to identify identifier portions by a particular length. For example, the identifier engine 720 can identify each identifier portion as 1 or 2 characters, digits, or symbols in length. In another example, each identifier portion is 1 digit or 1 character. In yet another example, the identifier engine 720 can be configured to identify variable-length identifier portions (e.g., a first identifier is "A" because it matches a list of known identifier portions, the second identifier is "BB" because "B" is not a known identifier portion and "BB" is a known identifier portion).

The identifier engine 720 can also be configured to identify a plurality of remediation levels in association with the identifier. For example, the plurality of remediation levels identify the remediation needed for the user based in part on the performance on the test. The remediation levels can include a first level of remediation and a second level of remediation, such that the first level of remediation corresponds with the first strand of the test, and the second level of remediation corresponds with the second strand of the test.

The identifier engine 720 can also be configured to encrypt and/or decrypt the identifier. For example, the identifier is decrypted before the remediation levels are identified in association with the identifier. In another example, the identifier is decrypted once the identifier is received from the user device. Details and features of the encryption process is provided in association with FIG. 12.

The identifier engine 720 can also be configured to interact with the identifier data store 680. For example, the identifier engine 720 can receive the identifier from the user device and/or the identifier data store 680. The identifier engine 720 may store and/or retrieve the identifier from the identifier data store 680.

The content customization system 402 also includes a validation processor 730. The validation processor 730 can be configured to identify a check portion with the identifier. The check portion can confirm that the identifier is provided correctly. For example, when the user provides the identifier with the appropriate check portion to the server, the server can identify that the identifier was provided correctly (e.g., typed, spoken, copied, pasted) by the user. In another example, the network page can include a scripting language to check the identifier locally at the user device without transmitting the identifier to the content customization system 402. In some examples, when the check portion is determined not to be valid, the validation processor 730 may transmit a notification to the user device regarding the identifier (e.g., "the identifier is incorrect," "please try to provide the identifier again," etc.).

In an illustrative example, the identifier is "1AGCJ-5ABEFH." The server can calculate the check portion by first assigning numeric values to any characters in the identifier (e.g., "A" is "1," "B" is "2," ... "Z" is 26"). Using this initial character translation, the identifier becomes "117310512568." The server can then implement one or more arithmetic operations to form the check portion. For example, the server can add or aggregate all digits to form a single-digit check portion number (e.g., 1+1+7+3+ . . . +8=40; 4+0=4). The single-digit check portion number would be 4. In another example, the server can add the digits placed in every other position or in each odd position (e.g., 1+7+1+5+2+6=22), multiply the sum by 3 (e.g., 22×3=66), and combine the results of each arithmetic operation to form a final check portion number (e.g., 22+66=88; 8+8=16; 1+6=7). The single-digit check portion number would be 7. In either of these examples, the single-digit check portion number can be compared with the check portion number received with the identifier. When the single-digit check portion number matches the check portion included with the identifier, the identifier may be determined to be a valid check portion.

In yet another example, a more complex, multi-step process may be performed to form the check portion. First, add the digits placed in odd positions (e.g., 1+7+1+5+2+ 6=22). Second, multiply the sum by 3 (e.g., 22×3=66). Third, add the digits placed in even positions (e.g., 1+3+0+ 1+5+8=18). Fourth, add the results from the second and third steps, including multiplying the odd digits by 3 and adding the even digits (e.g., 66+18=84). Fifth, divide the result by 10 and keep the remainder (e.g., remainder of 84/10=4). Sixth, subtract by 10 (e.g., 10−4=6). The single-digit check portion number would be 6. The single-digit check portion number can be compared with the check portion number received with the identifier. When the single-digit check portion number matches the check portion included with the identifier, the identifier may be determined to be a valid check portion.

The content customization system 402 also includes an access authorization processor 740. The access authorization processor 740 can be configured to receive an access code associated with the user of the test. The access code can indicate that a user and/or user device is allowed access to the data. The access authorization processor 740 can authenticate the access code before displaying the data and/or confirm that the particular user and/or user device has access to the data (e.g., after the access code is transmitted to the user device).

The access authorization processor 740 can also be configured to generate the access code. The access code can include one or more alphanumeric characters, including alphabetic characters, digits, and/or symbols. For example, an access code can be "01234-10-10-10-5." In some embodiments, the access authorization processor 740 interacts with the access authorization data store 780 to store the access code in the access authorization data store 780 in association with a user. Details and features of a graphical user interface that receives an access code is provided in association with FIG. 15.

The access authorization processor 740 can also be configured to interact with the access authorization data store 780. For example, when the access authorization processor 740 receives an access code, the access authorization processor 740 interacts with the access authorization data store 780 to store the access code (e.g., in association with a user and/or user device). In another example, the access code may be checked against other access codes that are already stored in the access authorization data store 780 to confirm that the access codes has only been used once. The access authorization processor 740 may retrieve the data for future uses and/or to process analytics.

The content customization system 402 also interacts with one or more data stores, including a data store 770 and access authorization data store 780. The data stores are associated with a distributed or local data system accessible by the content customization system 402.

The data store 770 stores information related to data. In some embodiments, for example, the data store 770 includes data or references to data for remediating performance on the test, including lectures, instructional videos, tutorials, question/answer portions, step-by-step instructions, supplemental learning material, references to books or instructions in content, or other information to help remediate performance on the test. Details and features of data is provided in association with FIG. 16.

The access authorization data store 780 stores information related to one or more access codes. For example, an access code can be "01234-10-10-10-5." The access code can be stored in the access authorization data store 780, along with information associated with the access code, including a corresponding user or account number. One or more access codes may be associated with a user.

Figure 8:
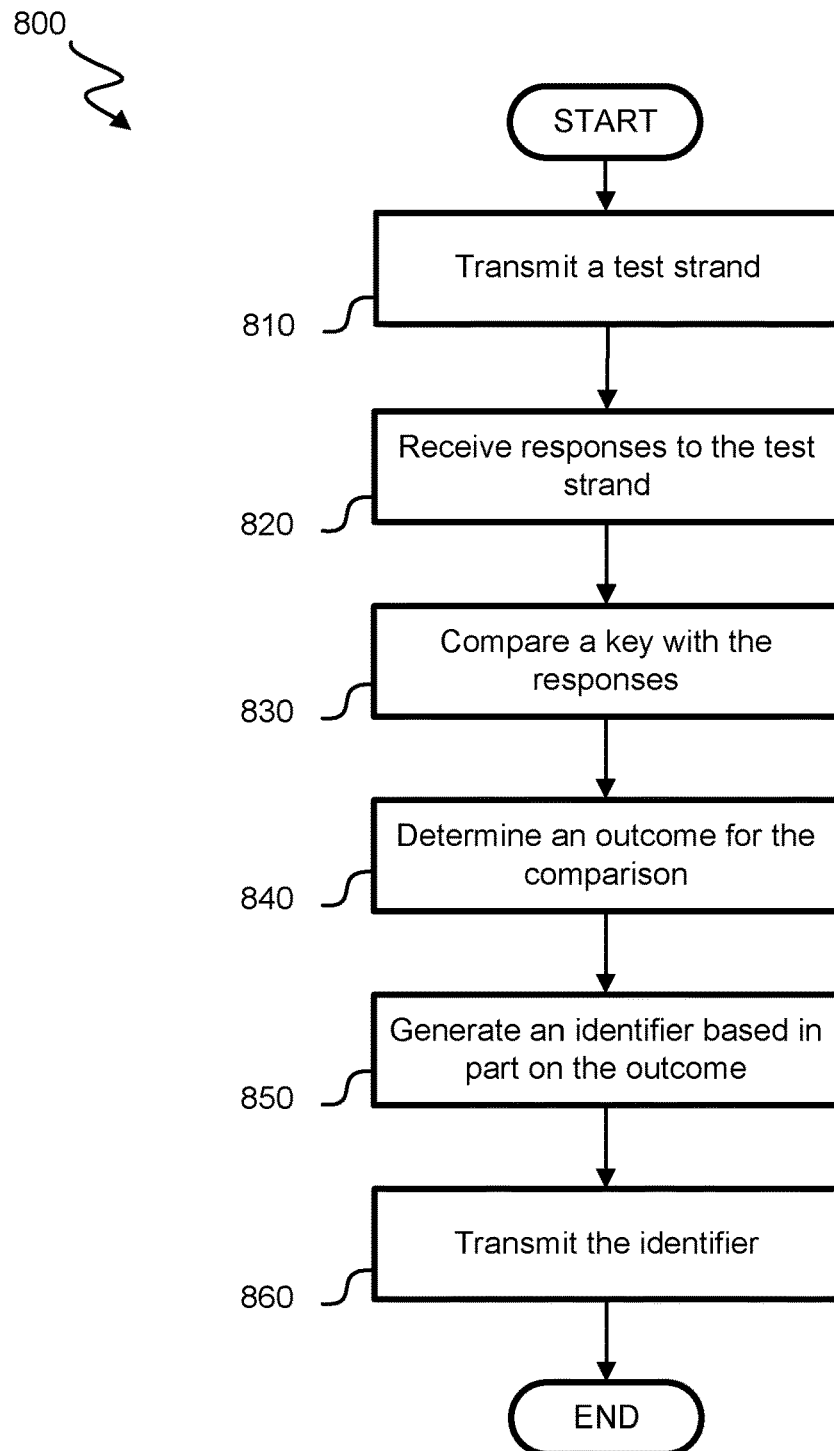
FIG. 8 illustrates an illustrative flow for implementing deidentified access of data described herein, according to at least one example.

With reference now to FIG. 8, the content management server 102 (e.g., the content customization system 402 and the evaluation system 406, etc.) may transmit data to the user device 106. In some embodiments, the content management server 102 (e.g., using the evaluation system 406, data engine 610, identifier engine 620, authenticator 630, workflow processor 640, or any data stores, including a content data store 670, identifier data store 680, and authentication data store 690, etc.) is responsible for diagnosing the performance of the user with a test and generating an identifier to access data to remediate future performance.

At block 810, transmit a test strand to a user device. The test may comprise a first test strand and a second test strand. The test strands can correspond with different sections of the test, including algebra, arithmetic, reading comprehension, sentence skills, or other subjects. The test strands can be provided in other formats, including difficulty levels (e.g., one strand is low difficulty, one strand is high difficulty), test types (e.g., logic, reading, games), nested sets of questions (e.g., one prompt for seven questions), and timeframes (e.g., one strand corresponds to one hour or day, a second strand corresponds to a different hour or day).

At block 820, receive responses from the user device. The responses may correspond with the first test strand and the second test strand.

In some embodiments, the content management server 102 may correlate the results at the strand with a score. For example, the results for a first strand may be ten correct. The content management server 102 (e.g., using the evaluation system 406) may compare the ten correct with an answer key corresponding to the first strand. The answer key may determine that zero to five correct results is a low score, six to ten correct results is a medium score, and eleven to fifteen correct results is a high score. Since the results for a first strand may be ten correct, the results may correspond with a high score. The process of determining the results and/or corresponding score may be a recursive process for each strand.

At block 830, compare a key with the responses. The evaluation system 406 (e.g., using the data engine 610, etc.) may compare the key with the responses from the user device. For example, the first question may be compared with a corresponding portion of the key that relates to the first question. The response to the first question may be correct or incorrect when compared with the key. In some embodiments, the comparisons of many portions or test strands may be aggregated so that a key is compared with the response(s) overall from the user device.

At block 840, determine an outcome for the comparison. The evaluation system 406 (e.g., using the data engine 610, etc.) may complete the comparison of the key with the response(s) and determine an outcome for the comparison. The outcome may correspond with the first test strand and the second test strand. For example, the content management server 102 may correlate one or more portions of the test with one or more portions of an identifier before the content management server 102 receives the results at the strand level. Examples of one or more outcomes is illustrated in FIGS. 10A-10B and 11A-11B.

At block 850, generate an identifier based in part on the outcome. The evaluation system 406 (e.g., using the identifier engine 620, etc.) may generate the identifier by combining the outcome from the comparison. In some embodiments, the identifier may be generated by concatenating portions of an identifier that correspond with the first test strand and the second test strand. In some embodiments, the identifier is generated by concatenating a first portion that corresponds with the first outcome and a second portion that corresponds with the second outcome.

In some embodiments, content management server 102 may encrypt the identifier using encryption processes discussed throughout the disclosure. For example, the content management server 102 may use secure data transmission protocols and/or encryption for data transfers, for example, File Transfer Protocol (FTP), Secure File Transfer Protocol (SFTP), and/or Pretty Good Privacy (PGP) encryption. An example encryption process is also illustrated with FIG. 12.

In some embodiments, content management server 102 may determine a check portion associated with the identifier. The check portion may be generated by translating the identifier to a numeric value and adding or aggregating the numeric values to a single value (e.g., the check portion). The check portion may help confirm that the identifier was provided correctly to a remediation server or webpage.

At block 860, transmit identifier to user device. The evaluation system 406 (e.g., using the identifier engine 620, the NIC 605, etc.) transmits the identifier to a user device. The user device may be enabled to access data associated with the first test strand and the second test strand and/or remediate data for remediating performance with the first test strand or the second test strand and/or future performance associated with different test strands. In some embodiments, the evaluation system 406 may be configured to transmit the remediate data as well.

Figure 9:
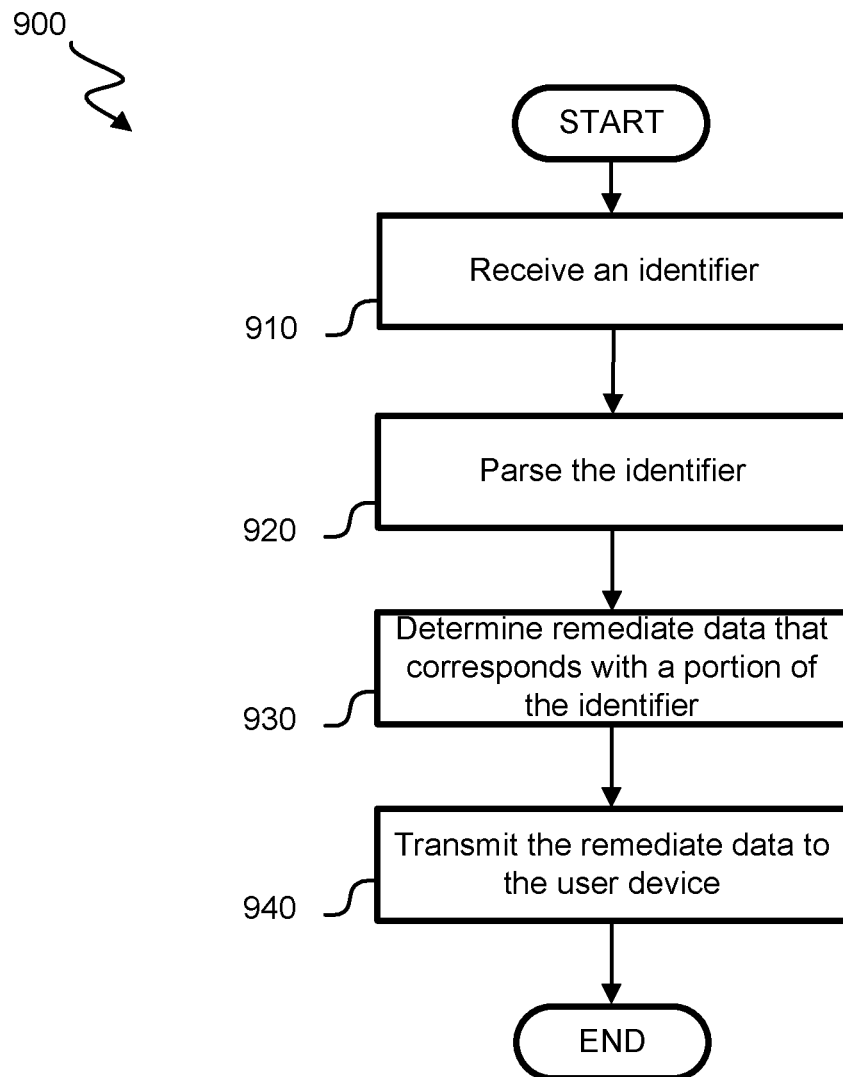
FIG. 9 illustrates an illustrative flow for implementing deidentified access of data described herein, according to at least one example.

With reference now to FIG. 9, the content management server 102 (e.g., the content customization system 402 and the evaluation system 406, etc.) may transmit data to the user device 106. In some embodiments, the content management server 102 is responsible for receiving and decoding the identifier and providing access to data associated with the identifier to remediate future performance. The content management server 102 in FIG. 8 may be the same implementation of the content management server 102 in FIG. 9, or may be implemented as more than one server in a content distribution network (CDN) 100.

At block 910, receive the identifier. For example, the content customization system 402 (e.g., using the NIC 605, etc.) may receive the identifier from a user device. The content customization system 402 may receive the identifier through a graphical user interface (GUI) as illustrated with FIG. 15.

At block 920, parse or decode the identifier. For example, the content customization system 402 (e.g., using the identifier engine 720, etc.) can be configured to receive an identifier and uniquely indicate one or more outcomes of the test by parsing one or more portions of the identifier. In some examples, the parsing may correspond with an identifier that is formed by concatenating portions to form the identifier, and then separating those portions to form portions of the identifier.

At block 930, determine remediate data that corresponds with a portion of the identifier (e.g., for remediating performance on the test). For example, the content customization system 402 (e.g., using the identifier engine 720, etc.) can be configured to receive an identifier and uniquely indicate one or more outcomes and/or remediation levels that corresponds with the one or more test strands.

In some embodiments, the identifier engine 720 can also be configured to encrypt and/or decrypt the identifier. For example, when the evaluation system 406 encrypts the identifier and transmits the encrypted identifier to the content customization system 402, the content customization system 402 can decrypt the identifier. The content customization system 402 can use secure data transmission protocols and/or encryption for data transfers, for example, File Transfer Protocol (FTP), Secure File Transfer Protocol (SFTP), and/or Pretty Good Privacy (PGP) encryption. An example encryption process is also illustrated with FIG. 12.

In some embodiments, a check portion may be included with the identifier. The content customization system 402 (e.g., using the validation processor 730, etc.) can authenticate check portion with the identifier (e.g., to confirm whether one or more portions of the identifier were lost during transmission, etc.).

At block 940, remediate data corresponding with the identifier may be transmitted to the user device. For example, the content customization system 402 may interact with the data store 770 to retrieve and provide remediate data that corresponds with the outcome (e.g., the outcome is "low" for test strand 1, so the remediate data provided to the user device can remediate performance when the outcome is associated with "low" for that particular test strand, etc.).

In some embodiments, the identifier and/or test strands may be stored in a data store. The data store may be located in a cloud, hosted environment, or locally in association with the content management server 102.

With reference now to FIGS. 10A-10B, illustrations of data that are stored in the test content data store are shown. As shown in FIG. 10A, the illustration shows a plurality of test strands in a test that are associated with an identifier or an identifier portion. For example, a test includes a plurality of test strands including instruction memory, registers, arithmetic logic unit (ALU), and data memory corresponding to portions along a pipelined computer data path. In other examples, the plurality of test strands may include arithmetic, reading comprehension, sentence skills, and algebra. One or more strands of the test may be associated with an identifier and/or identifier portion. For example, the instruction memory strand of the test is associated with a "1" identifier portion, the registers strand of the test is associated with a "2" identifier portion, the arithmetic logic unit (ALU) strand is associated with a "3" identifier portion, and the data memory strand is associated with a "4" identifier portion.

In some embodiments, the identifier portions are concatenated to generate an identifier. For example, when the test includes instruction memory and registers, "1" and "2" may be concatenated to create an identifier of "12." The identifier may correlate to a data to remediate performance in instruction memory and registers.

As shown in FIG. 10B, the illustration shows a plurality of test strands in a test that are associated with an identifier or identifier portion. For example, the test includes a plurality of test strands including instruction memory, registers, arithmetic logic unit (ALU), and data memory.

One or more test strands in the test are also associated with a plurality of remediation levels, including "low," "medium," and "high." For example, when the user performs poorly on an instruction memory strand, the strand associated with that user's performance is "instruction memory—low." In another example, when the user performs average on an instruction memory strand, the strand associated with that user's performance is "instruction memory—medium." In another example, when the user performs well on an instruction memory strand, the strand associated with that user's performance is "instruction memory—high." Each of these strands may correspond with an absolute number of correct answers (e.g., 1-3 correct is "low," 4-6 correct is "medium," 7-10 correct is "high") or weighted average of correct answers, based in part on the difficulty of the particular test question and/or strand of the test.

In some embodiments, the one or more strands of the test and the remediation level are associated with identifiers and/or identifier portions. For example, when the user performs poorly on an instruction memory strand, this strand of the test is associated with an "A" identifier portion. When the user performs average on the instruction memory strand, this strand of the test is associated with a "B" identifier portion. When the user performs well on the instruction memory strand, this strand of the test is associated with a "C" identifier portion, and so on as illustrated.

In some embodiments, the identifier portions are concatenated to generate an identifier. For example, when the test includes arithmetic, the user performed poorly on the arithmetic word problem strand (e.g., "A") and also performed poorly on the arithmetic computation with decimals strand (e.g., "D"), "A" and "D" may be concatenated to create an identifier of "AD." Other identifier portions are added as well, including an identifier portion associated with the generic test strand, arithmetic (e.g., "1"), to create an identifier of "1AD." The identifier may correlate to data to remediate performance (e.g., in arithmetic).

In some embodiments, the identifier portions from a plurality of test strands are concatenated to generate an identifier. For example, when the test includes arithmetic (e.g., "1") and reading comprehension (e.g., "2"), and the user performed poorly on the arithmetic word problem strand (e.g., "A"), but performed well on reading comprehension sentence relationships (e.g., "C"), each of the identifier portions may be concatenated to create an identifier of "1A2C," "2C-1A," or "1A-2C." The identifier may correlate to data to remediate performance (e.g., in arithmetic and reading comprehension).

With reference now to FIGS. 11A-11B, illustrations of data that are stored in the test content data store are shown. As shown in FIG. 11A, the illustration shows a plurality of test strands in a test that are associated with an identifier or an identifier portion. For example, a test includes a plurality of test strands including instruction memory, registers, arithmetic logic unit (ALU), and data memory. One or more strands of the test may be associated with an identifier and/or identifier portions, including arithmetic logic unit (ALU)-AND gate with "TA," arithmetic logic unit (ALU)-OR gate with "GR," arithmetic logic unit (ALU)-inverter with "EE," and arithmetic logic unit (ALU)-multiplexor with "9P."

In some embodiments, the identifier portions are concatenated to generate an identifier. For example, when the test includes arithmetic logic unit (ALU)-AND gate and arithmetic logic unit (ALU)-OR gate, "TA" and "GR" may be concatenated to create an identifier of "TAGR" or "TA-GR." The identifier may correlate to data to remediate performance in ALU-AND gate as well as the OR gate test strands.

As shown in FIG. 11B, the illustration shows a plurality of test strands in a test that are associated with an identifier or identifier portion. For example, the test includes a plurality of test strands including instruction memory, registers, arithmetic logic unit (ALU), and data memory.

One or more test strands in the test are also associated with a plurality of remediation levels, including "10% correct," "20% correct," through "100% correct." For example, when the user answers only 10-percent of the questions correctly on an ALU-AND gate strand, the strand associated with that user's performance is "ALU-AND gate-10% correct." In another example, when the user answers only 50-percent of the questions correctly on an ALU-AND gate strand, the strand associated with that user's performance is "ALU-AND gate-50% correct." In another example, when the user answers 90-percent of the questions correctly on an ALU-AND gate strand, the strand associated with that user's performance is "ALU-AND gate-90% correct."

In some embodiments, the one or more strands of the test and the remediation level are associated with identifiers and/or identifier portions. For example, when the user answers only 10-percent of the questions correctly on an ALU-AND gate strand, this strand of the test is associated with an "42" identifier portion. When the user answers only 50-percent of the questions correctly on the ALU-AND gate strand, this strand of the test is associated with a "QB" identifier portion. When the user answers 90-percent of the questions correctly on the ALU-AND gate strand, this strand of the test is associated with a "BC" identifier portion, and so on as illustrated.

In some embodiments, the identifier portions are concatenated to generate an identifier. For example, when the test includes ALU-AND gate (e.g., "TA") and the user answers only 10-percent of the questions correctly on the ALU-AND gate strand (e.g., "42"), "TA" and "42" may be concatenated to create an identifier of "TA42." The identifier may correlate to data to remediate performance in one or more strands of the test.

Figure 12:
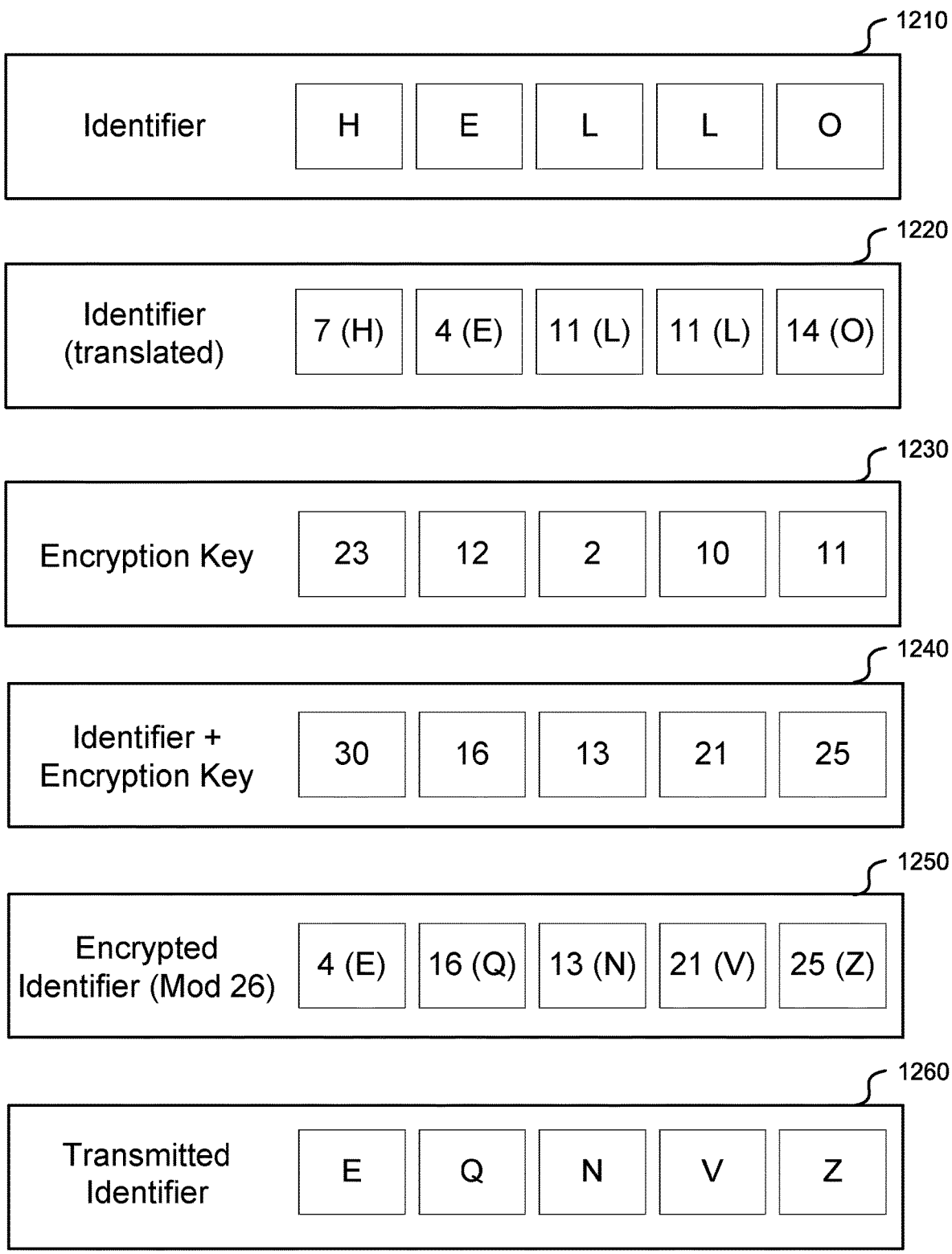
FIG. 12 illustrates an example encryption process of an identifier, according to at least one example.

With reference now to FIG. 12, an illustration of an example encryption process of an identifier is shown. In some embodiments, the identifier is encrypted (e.g., by the server) before the identifier is transmitted and decrypted after the identifier is received (e.g., by the server). Encryption may encode the identifier so that third parties cannot read the identifier, even if the third party possesses the answer key that identifies the identifier portions for a particular remediation level within the identifier (e.g., "QB" means that the user answers 50-percent of the questions correctly on the ALU-AND gate strand). For example, the encryption process includes any encryption algorithm to encrypt the identifier, including a one-time pad encryption (as shown), symmetric key encryption, or public key encryption.

At block 1210, the identifier is generated as "HELLO." The identifier can be associated with the user of the test and uniquely indicate the outcome of one or more strands of the test (e.g., based in part on a comparison of the user's test answers with the correct answers). For example, the "H" represents ALU-AND gate, "E" represents performing well on the ALU-OR gate strand problems, "LL" represents performing poorly on the instruction memory strand, and "O" represents performing well on ALU-AND gate percentage calculations. As shown in some examples, the module that parses the identifier is configured to identify (e.g., parse) one character, digit, or symbol at a time (e.g., H, E, O), more than one character, digit, or symbol at a time (e.g., LL), or a combination of one or more than one character, digit, or symbol at a time.

At block 1220, the identifier is translated to a numerical equivalent. For example, one method of translating the identifier to a numerical equivalent corresponds with associating each character to the position that the number occupies in a 0-25 letter alphabet (e.g., "A" is 0, "B" is 1, "C" is 2). In this example, the identifier is translated to "7-4-11-11-14," which corresponds with "H" as the $7^{th}$ letter, "E" as the $4^{th}$ letter, "L" as the $11^{th}$ letter, and "O" as the $14^{th}$ letter.

At block 1230, the encryption key is identified. For example, when using a one-time pad encryption, the encryption key identifies a corresponding value from a secret random key (e.g., the $10^{th}$ sheet on a pad on June $1^{st}$, the next available key in a pad of potential encryption keys). The encryption key can identify that the first digit should be combined with the number "23," the second digit should be combined with "12," the third digit should be combined with "2," the fourth digit should be combined with "10," and the fifth digit should be combined with "11." The encryption key may be unique for each encryption (e.g., only used once) and kept secret. In this example, the key is combined with each character, digit, or symbol of the identifier, so "7" or "H" should be combined with "23," "4" or "E" should be combined with "12," "11" or "L" should be combined with "2," "11" or "L" should be combined with "10," and "14" or "O" should be combined with "11."

In some embodiments, the testing server 110 and the content customization system 402 each possess the encryption key for encrypting and decrypting the identifier. For example, the testing server 110 and the content customization system 402 each identify the appropriate unused page from the pad. The corresponding page at each location can identify the same key (e.g., the first digit should be combined with the number "23," the second digit should be combined with "12"), so that when the testing server 110 combines the key with the identifier to encrypt the identifier, the content customization system 402 can combine the key with the identifier to decrypt the identifier.

At block 1240, the encryption key and identifier are combined. For example, "7" is combined with "23" to form "30," "4" is combined with "12" to form "16," "11" is combined with "2" to form "13," "11" is combined with "10" to form "21," and "14" is combined with "11" to form "25." The combination creates a combined identifier of "30-16-13-21-25."

At block 1250, the modular remainder is identified from the combined key and identifier, so that when the combined key and identifier is a value larger than 26, the remainder after subtraction of 26 is taken as the new digit. For example, since "30" is greater than "26," the modular value for the first digit is calculated and replaced with "4." Since each of the other digits is less than "26," the other digits remain unchanged after the combination, creating an encrypted identifier "4-16-13-21-25," which corresponds with "E" as the $4^{th}$ letter, "Q" as the $16^{th}$ letter, "N" as the $13^{th}$ letter, "V" as the $21^{st}$ letter, and "Z" as the $25^{th}$ letter.

At block 1260, the digits are translated back to letter values and transmitted. In some examples, the letter values may be the same length of characters, digits, or symbols in the original identifier. For example, the encrypted identifier is "EQNVZ," which corresponds with the decrypted identifier "HELLO."

Figure 13:
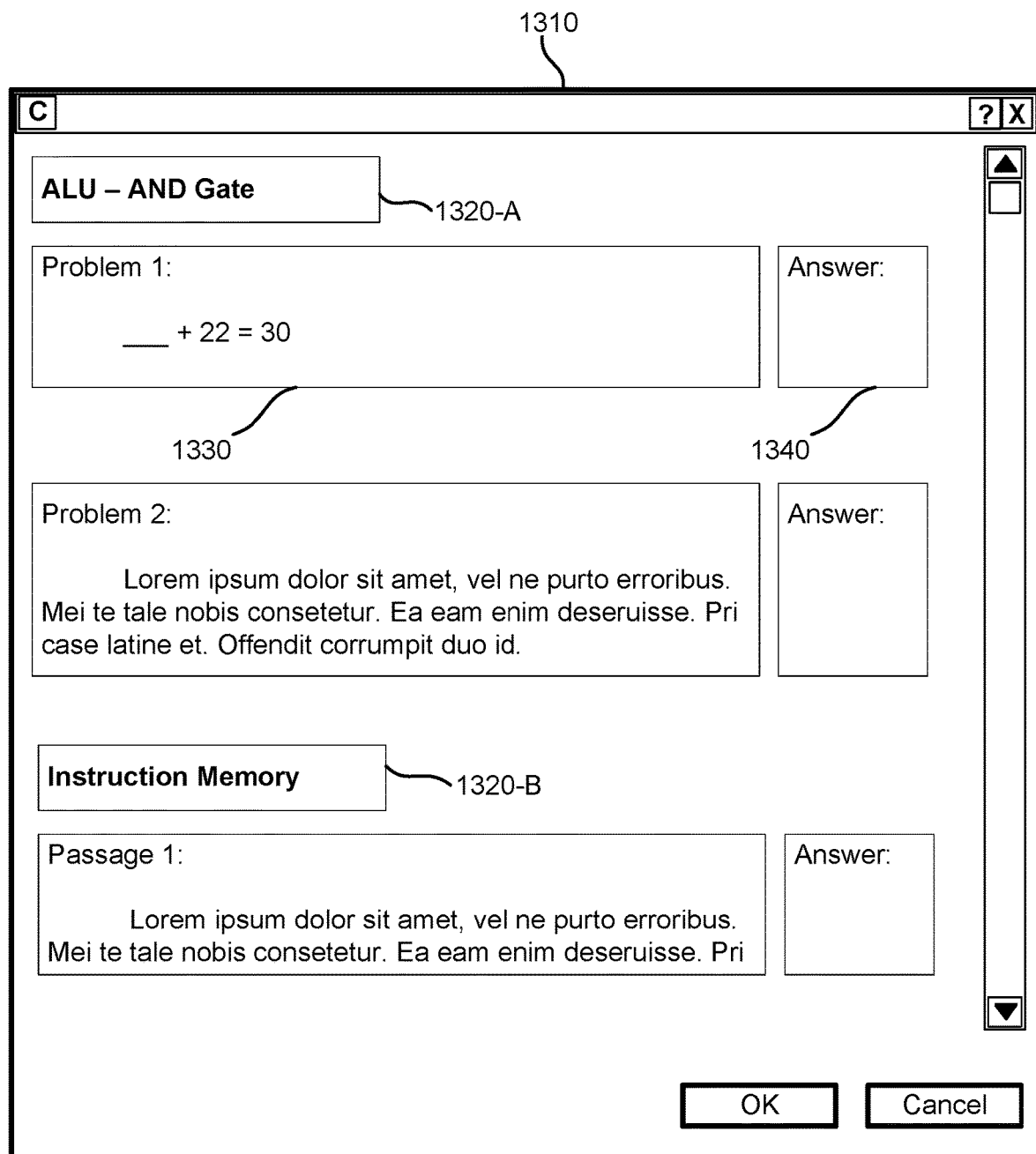
FIG. 13 illustrates an example graphical user interface for displaying a test, according to at least one example.

With reference now to FIG. 13, an illustration of a graphical user interface for displaying a test is shown. The test is provided on a graphical user interface (GUI) 1310. As shown, the GUI 1310 can include one or more strands of a test 1320 (herein shown as 1320-A and 1320-B), one or more test questions 1330, and one or more GUI input elements 1340 to accept test answers, including text boxes. In some examples, the test includes only one strand of a test 1320 (e.g., only algebra or only reading comprehension).

The GUI 1310 includes one or more strands of a test 1320. As shown, the strands of the test are "ALU-AND gate" and "Instruction Memory." The strands may include subjects (e.g., along a pipeline data path), difficulty levels (e.g., low difficulty, high difficulty), test types (e.g., gates, multiplexors, instruction memory), nested sets of questions (e.g., one prompt for seven questions), timeframes (e.g., day 1 questions, day 2 questions), or other portions of a test.

The GUI 1310 also includes one or more test questions 1330. The test questions can vary by the type of test and/or strands presented in the test. As shown, the test question that includes: "_+22=30." In another example, a test question that includes: "A person has 10 apples in his fruit basket, but needs 32 apples. How many apples should the person get from the store?"

The GUI 1310 also includes one or more GUI input elements 1340. As shown, the GUI input elements 1340 can include test boxes. Alternative GUI input elements can include radio buttons, drop-down menus, or expanded text boxes (e.g., to enter essay-type responses). The user may use the GUI input elements 1340 to provide responses (e.g., type, select) in order to generate a test answer to a particular test question. For example, in response to question 1, the user can type "8" and in response to question 2, the user can type "22."

Figure 14:
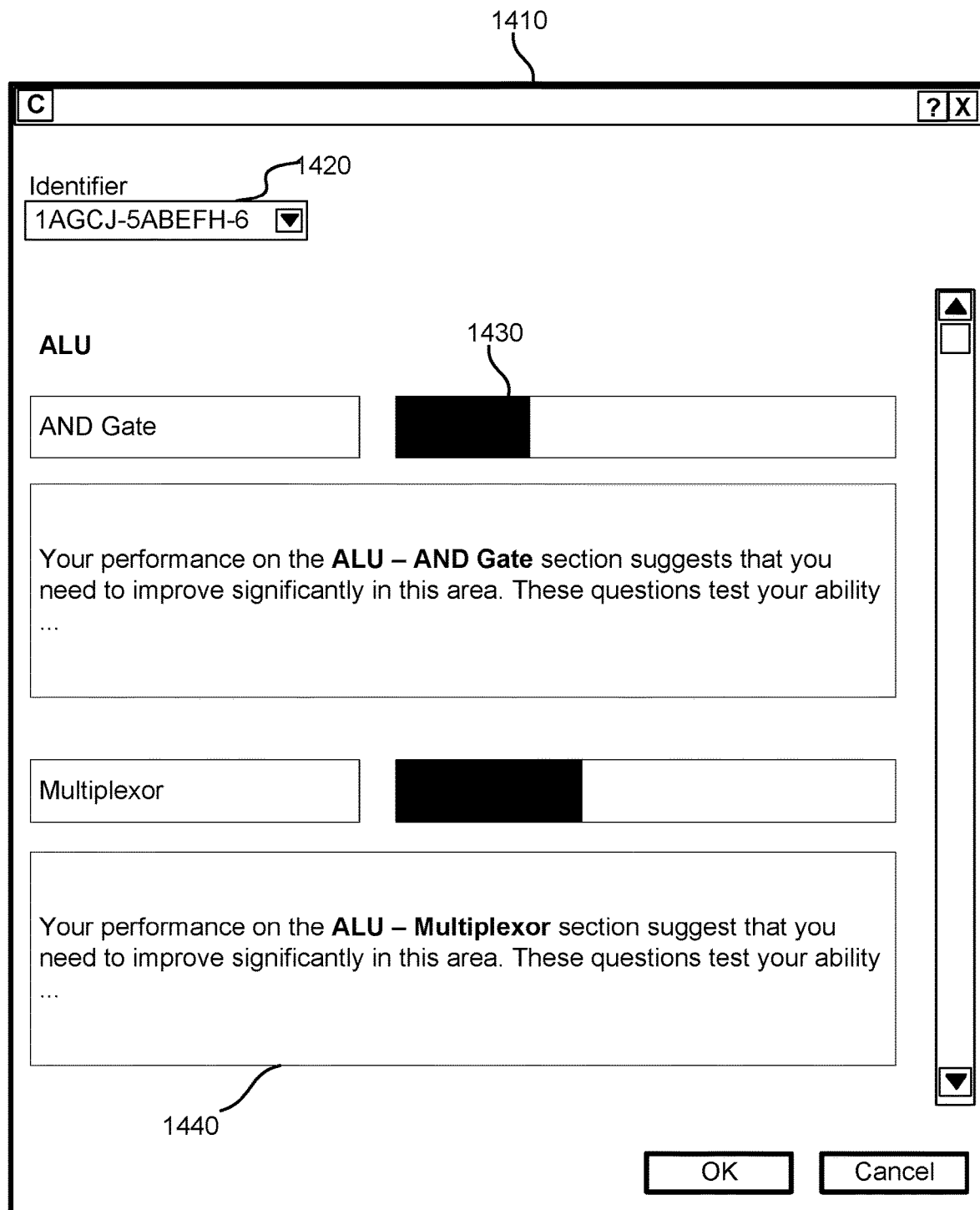
FIG. 14 illustrates an example graphical user interface for displaying a review, according to at least one example.

With reference now to FIG. 14, an illustration of a graphical user interface for displaying a diagnostic review is shown. The diagnostic review is provided on a graphical user interface (GUI) 1410. As shown, the GUI 1410 includes an identifier 1420 and data, including a psychographic illustration 1430 and a human-readable description 1440 associated with the performance of the user.

The GUI 1410 includes an identifier 1420. In some embodiments, the identifier is received from a user device after the user completes the test. For example, as shown, the user's test answers are received for a plurality of test strands in a test. The test answers are compared with the correct answers in a key and an outcome is determined for each strand for the test, based in part on the comparison. The identifier can uniquely indicate the outcome of one or more strands of the test.

The GUI 1410 also includes data. The data can identify the performance of the user on the test. For example, when the identifier indicates that the user's performance on the main ideas portion of the reading comprehension strand was low, the data can identify the poor performance appropriately.

The data can include a psychographic illustration 1430, including bars, lines, charts, graphics, or other formats for presenting information to a user. For example, data for a strand may display a colored-bar chart, where a color (e.g., green) identifies a relatively "high" outcome and a different color (e.g., red) identifies a relatively "low" outcome. In another example, the placement of the bar is affected by the difficulty level of the test questions. For instances, the illustrated data can be identical for a student that answered six easy questions correctly out of ten total questions, and the student that answered three difficult questions correctly out of ten total questions. The psychographic illustration 1430 can highlight which test strands need improvement or meet a minimum standard of competency based in part on the analysis.

The data can include a human-readable description 1440 associated with the performance of the user. A human-readable description may include a representation of data or information that can be naturally read by humans. For example, the human-readable description 1440 includes the test strand (e.g., ALU-AND gate, multiplexor), a description of the test strand (e.g., "These questions test your ability to identify the relationships amongst sentences, grasping key details that support the main idea."), the outcome and/or suggestions to improve performance (e.g., "you need to improve significantly in this area"), or other information.

Figure 15:
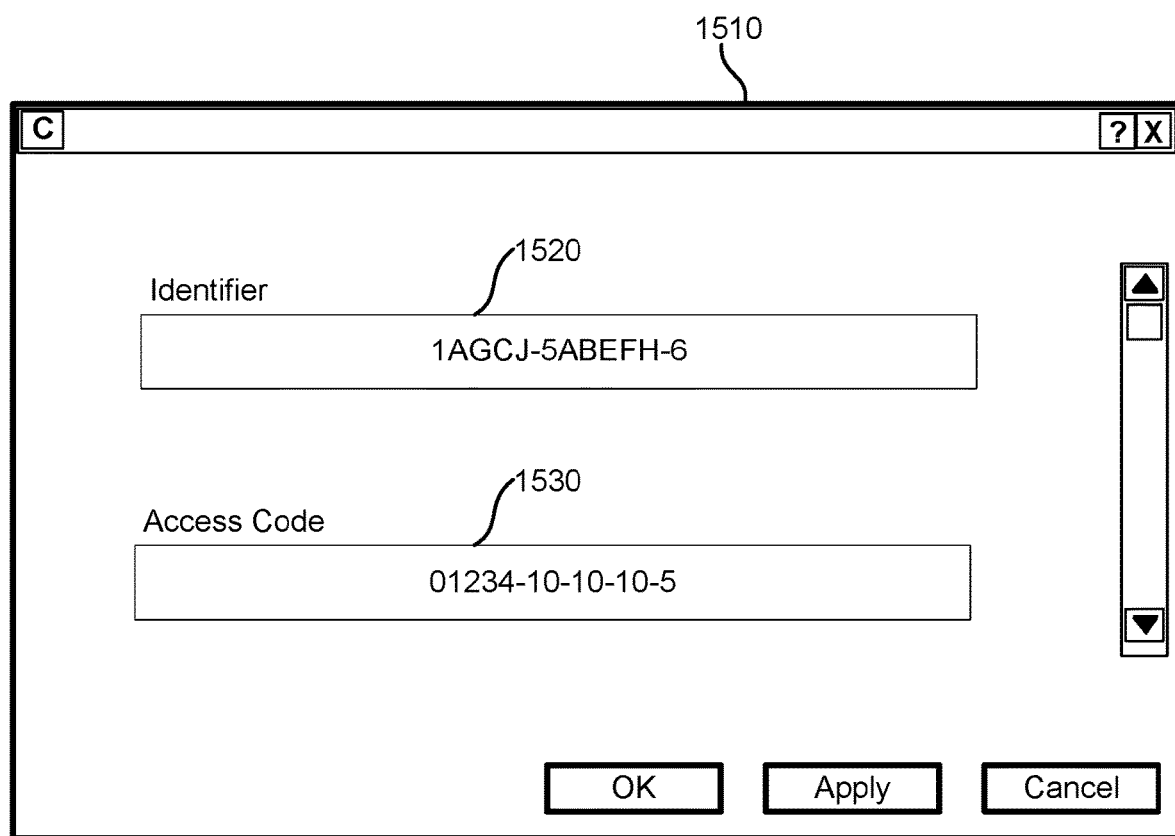
FIG. 15 illustrates an example graphical user interface for accessing data, according to at least one example.

With reference now to FIG. 15, an illustration of a graphical user interface for accessing data is shown. A graphical user interface (GUI) 1510 for accessing data is provided. As shown, the GUI 1510 includes an identifier 1520 and an access code 1530.

The GUI 1510 includes an identifier 1520. For example, the identifier is received from a user device after the user completes the test. After a user device receives an identifier, the user device provides the identifier to the GUI 1510 to access the data. The identifier can uniquely identify data for remediating performance on the test.

The GUI 1510 also includes an access code 1530. For example, the user may provide the access code via a user device to the GUI 1510. The access code can indicate that a user and/or user device is allowed access to the data. The GUI and/or server can authenticate the access code before displaying the data and/or confirm that the particular user and/or user device has access to the data.

Figure 16:
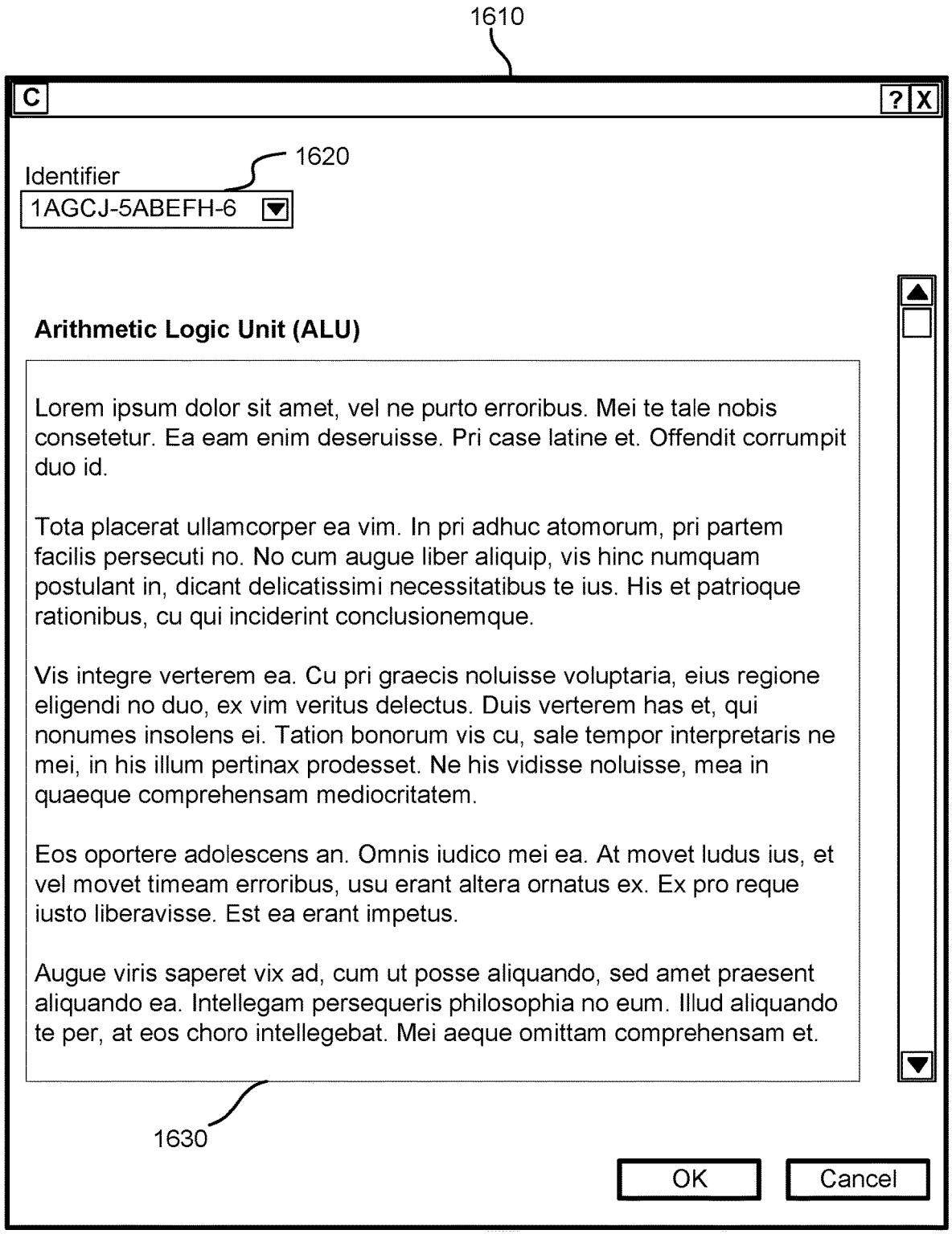
FIG. 16 illustrates an example graphical user interface for displaying data, according to at least one example.

With reference now to FIG. 16, an illustration of a graphical user interface for displaying data is shown. A graphical user interface (GUI) 1610 for displaying data is provided. As shown, the GUI 1610 includes an identifier 1620 and data 1630.

The server may access data (e.g., stored in an data store 770) and/or determine which data to utilize. The data may include one or more strands of data, including a first strand of data and a second strand of data. The strands of data can correlate with the strands of the test, including a first strand of the test and a second strand of the test.

The GUI 1610 receives the identifier and data is identified for the particular identifier. For example, the identifier can help identify a plurality of remediation levels to help identify the remediation needed for the user based in part on the performance on the test. The plurality of remediation levels can include a first level of remediation and a second level of remediation, so that the first level of remediation corresponds with the first strand of the test and the second level of remediation corresponds with the second strand of the test.

Once the data is determined in association with the particular remediation needed for the identifier, the GUI 1610 displays the data 1630. For example, data 1630 includes an algebra problem and step-by-step instructions on how to approach solving the algebra problem. Other methods of providing data may also be supported, including lectures, instructional videos, tutorials, question/answer portions, supplemental learning material, references to books or instructions in content, or other information to help remediate performance on the test.

Figure 17:
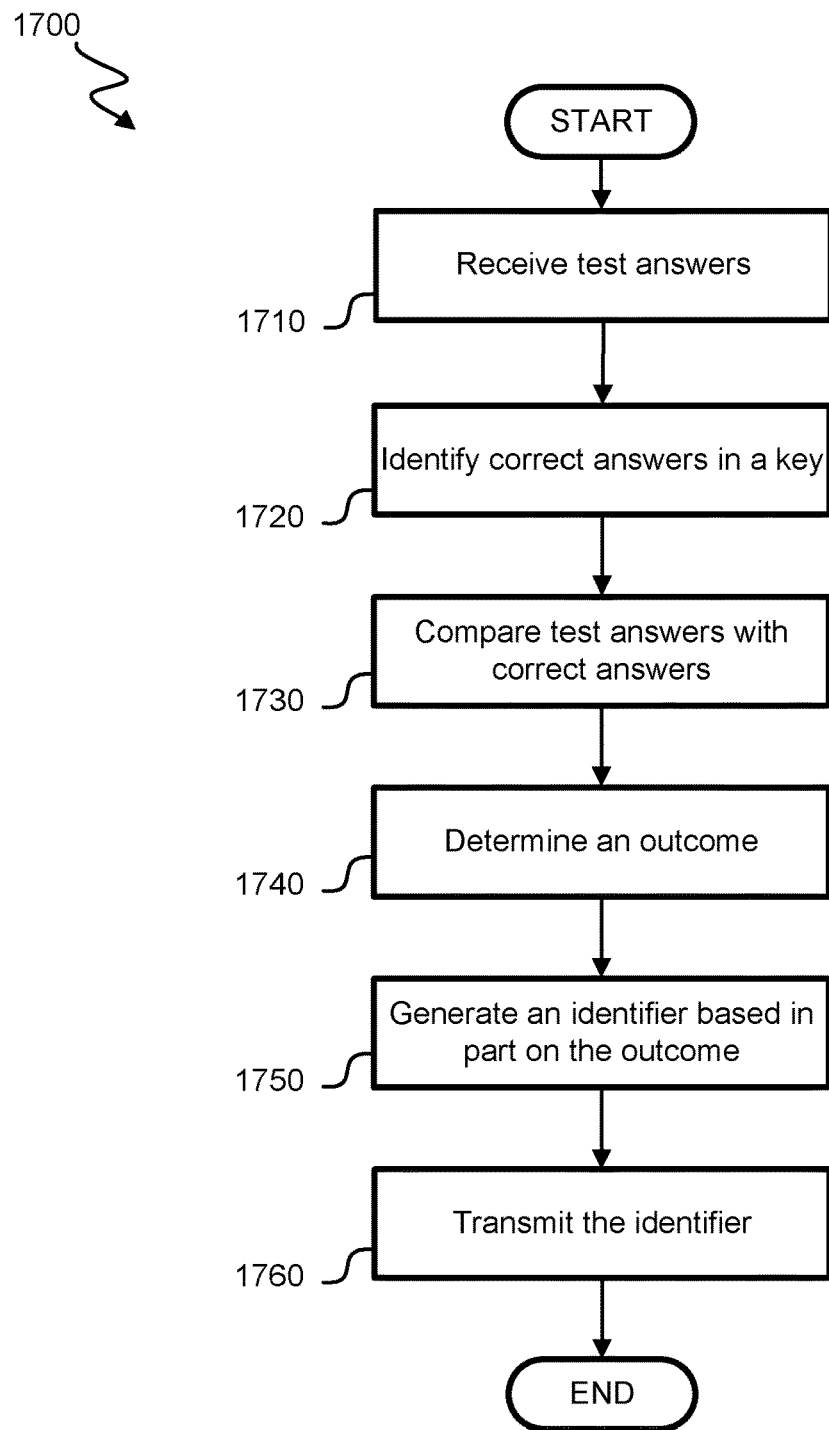
FIG. 17 illustrates an illustrative flow for implementing deidentified access of data described herein, according to at least one example.

With reference now to FIG. 17, a flowchart illustrating one embodiment of implementing deidentified access of data is shown. The process 1700 is performed by one or several of the components of the system 100. The process 1700 begins at block 1710 when test answers are received. For example, the user device provides a plurality of strands of a test that include one or more test questions. The user operates the user device to provide test answers in response to the one or more test questions. The user device transmits the test answers to a server.

At block 1720, the process identifies correct answers in a key. For example, a server identifies the correct answers in a key (e.g., identifying the appropriate test, identifying the appropriate version of the test) and also receives the test answers. The server may also store the correct answers and/or answer key in a data store for future use.

At block 1730, the process compares the test answers with the correct answers. For example, the server can compare the appropriate correct answers with the corresponding test answers received from the user device. In some embodiments, the server can retrieve the correct answers from the data store and/or dynamically compare the correct answers to the received test answers from the user.

At block 1740, the process determines an outcome. For example, the outcome is based on the comparison. The comparison can identify one or more correct responses provided in one or more strands of the test, including a first outcome for the comparison between the first set of test answers and the corresponding correct responses and a second outcome for the comparison between the second set of test answers and the corresponding correct responses.

At block 1750, the process generates an identifier based in part on the outcome. The identifier may uniquely indicate the outcome of one or more strands of the test. The identifier may also be coded to obscure unaided human interpretation of the outcome. The identifier may also uniquely identify data for remediating performance on the test. Additional details and features of block 1750 are provided in association with FIG. 18.

Figure 18:
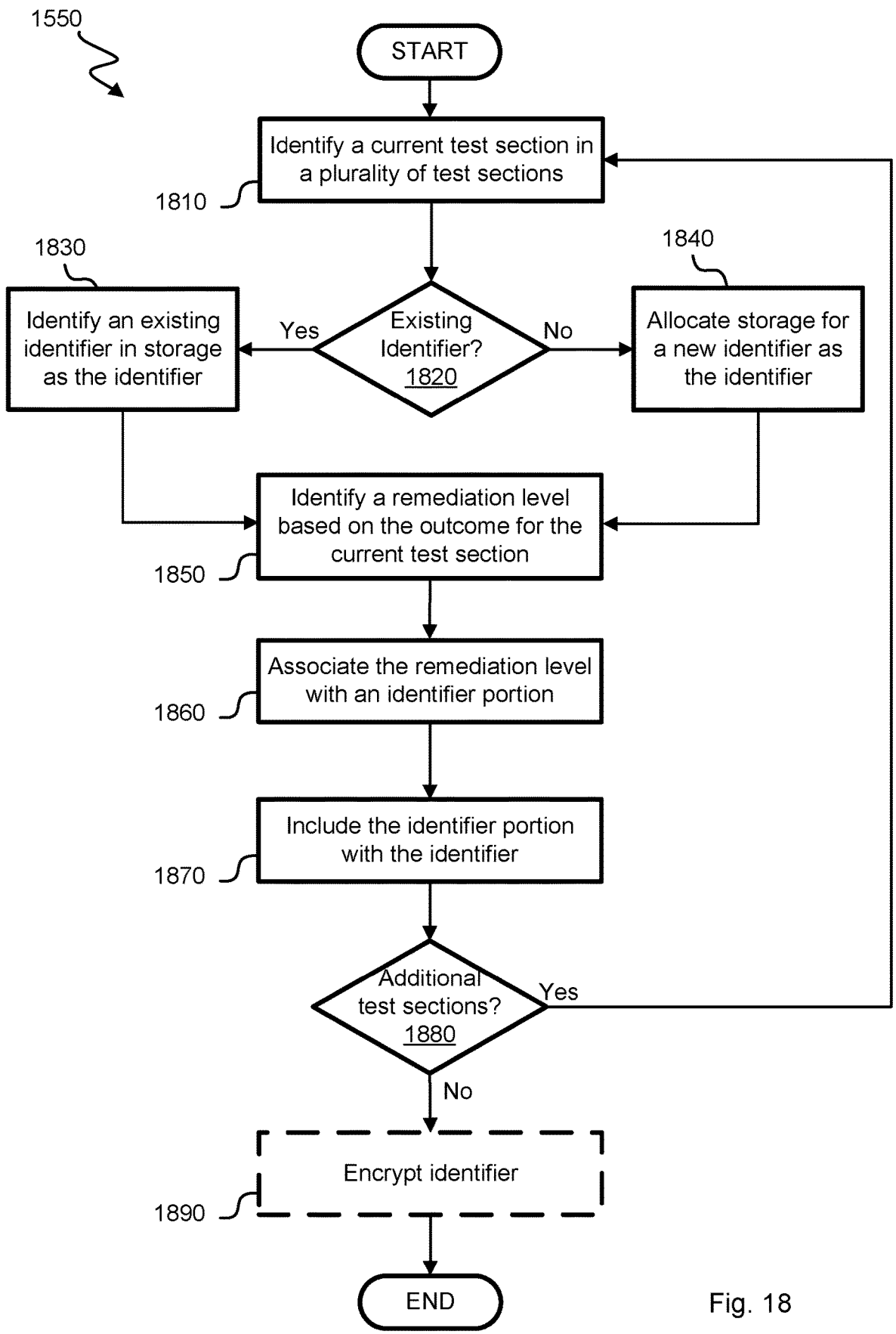
FIG. 18 illustrates an illustrative flow for implementing deidentified access of data described herein, according to at least one example.

With reference now to FIG. 18, a flowchart illustrating one embodiment of implementing deidentified access of data is shown. The process 1750 is performed by one or several of the components of the system 100. The process 1750 begins at block 1810 by identifying a current test strand in a plurality of test strands. For example, the current test strand may be "algebra" out of a plurality of test strands including arithmetic, reading comprehension, sentence skills, and algebra.

At block 1820, the process determines whether an identifier exists. For example, the identifier may be associated with the user of a test and the process can determine if the user is currently associated with one or more identifiers. This can include asking the user for the identifier, querying one or more data stores for an identifier, or other means of identifying an identifier for a user.

A decision from block 1820 may be made. If yes, the process proceeds to block 1830, where the process identifies an existing identifier in storage as the identifier. The identifier may be located in the identifier data store or other accessible temporary/permanent data store. If not, the process proceeds to block 1840, when the process allocates storage for a new identifier. For example, the process can dynamically allocate portions of storage (e.g. random access memory, virtual memory) and de-allocate the storage when the storage is no longer needed.

At block 1850, the process identifies the remediation level based on the outcome for the current test strand. For example, the user may have performed poorly on algebra, identifying the need for remediation for most of the topics covered in the test strand. In another example, the process can identify the remediation level for particular portions of the current test subject, including the "find a variable" strand and the "evaluating algebraic expressions" strand of the algebra test strand.

At block 1860, the process associates the remediation level with an identifier portion. For example, the poor performance on algebra can be associated with an "A" identifier portion (e.g., meaning "low" or "poor performance") or "1A" identifier portion (e.g., meaning "low" or "poor performance" on algebra). In another example, the poor performance for particular portions of the current test subject, including the "find a variable" strand and the "evaluating algebraic expressions" strand of the algebra test strand can be associated with other identifier portions, including "1GCE" or "1A-2B."

At block 1870, the process includes the identifier portion with the identifier. For example, the identifier portions are concatenated to generate an identifier. The "A" and "D" may be concatenated to create an identifier of "AD." Other identifier portions are added as well, including an identifier portion associated with the generic test strand, algebra (e.g., "1"), to create an identifier of "1AD." The identifier may correlate to data to remediate performance (e.g., in algebra).

At block 1880, the process determines whether additional strands of the test are present. For example, when the user interacts with a test that includes an algebra test strand and a reading comprehension test strand, and the process has not analyzed the reading comprehension test strand, the process would determine that additional strands of the test are present. As shown, some examples of a test include only one strand of a test (e.g., only algebra or only reading comprehension), so the process can determine that no additional strands of the test are present.

A decision from block 1880 may be made. If yes, the process returns to block 1810, where the process identifies a current test strand in a plurality of test strands (e.g., reading comprehension, a subsequent test strand after algebra). If not, the process proceeds to block 1890. At block 1890, the process encrypts the identifier. The encryption may be optional. For example, the encryption can encode the identifier so that third parties cannot read the identifier, even if the third party possesses the answer key that identifies the identifier portions for a particular remediation level.

Returning to FIG. 17 at block 1760, the process transmits the identifier. For example, the identifier is transmitted via a wired or wireless connection to one or more intranets, internets, public or private channels, communication tunnels between one or more servers, or other means of communication to a user device. The identifier may be encrypted before the identifier is transmitted. In another example, the identifier is transmitted to a data store to archive the identifier for future use.

Figure 19:
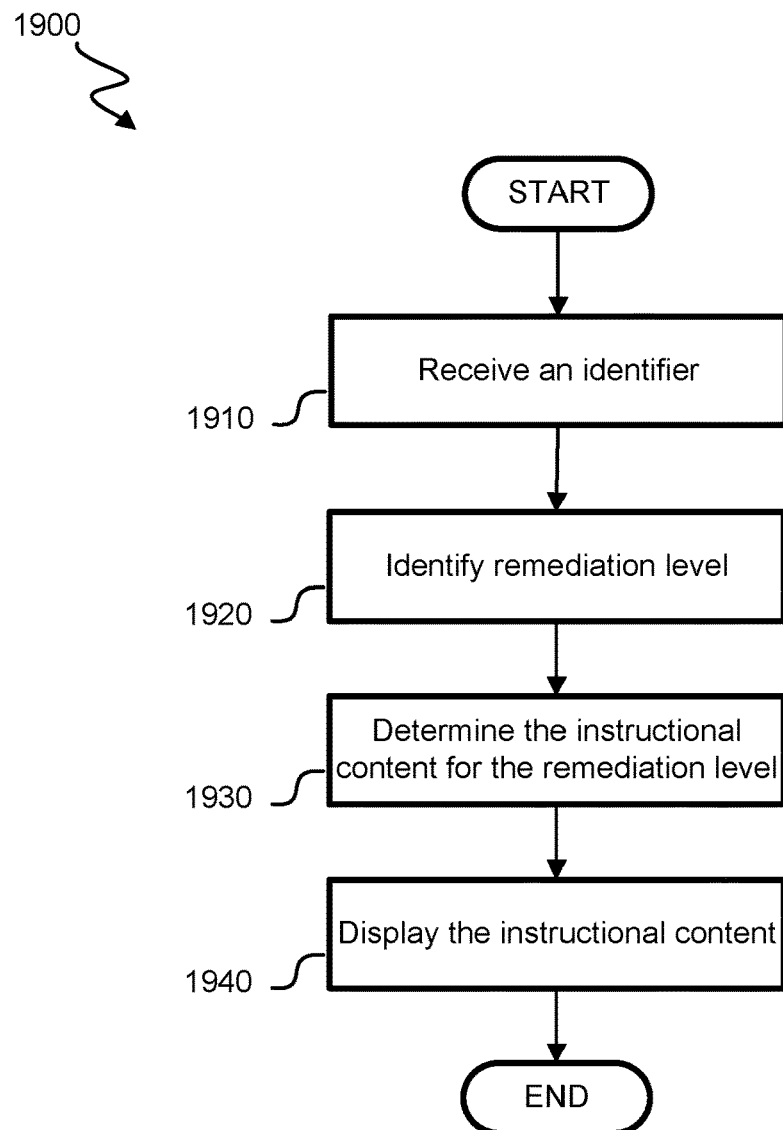
FIG. 19 illustrates an illustrative flow for implementing deidentified access of data described herein, according to at least one example.

With reference now to FIG. 19, a flowchart illustrating one embodiment of implementing deidentified access of data is shown. The process 1900 is performed by one or several of the components of the system 100. The process 1900 begins at block 1910 when the identifier is received. For example, the identifier is received via a wired or wireless connection to one or more intranets, internets, public or private channels, communication tunnels between one or more servers, or other means of communication from a user device. The received identifier may be encrypted. In another example, the identifier is received from a data store.

At block 1920, the process identifies a remediation level. For example, the plurality of remediation levels identify the remediation needed for the user based in part on the performance on the test. Additional details and features of block 1920 are provided in association with FIG. 20.

Figure 20:
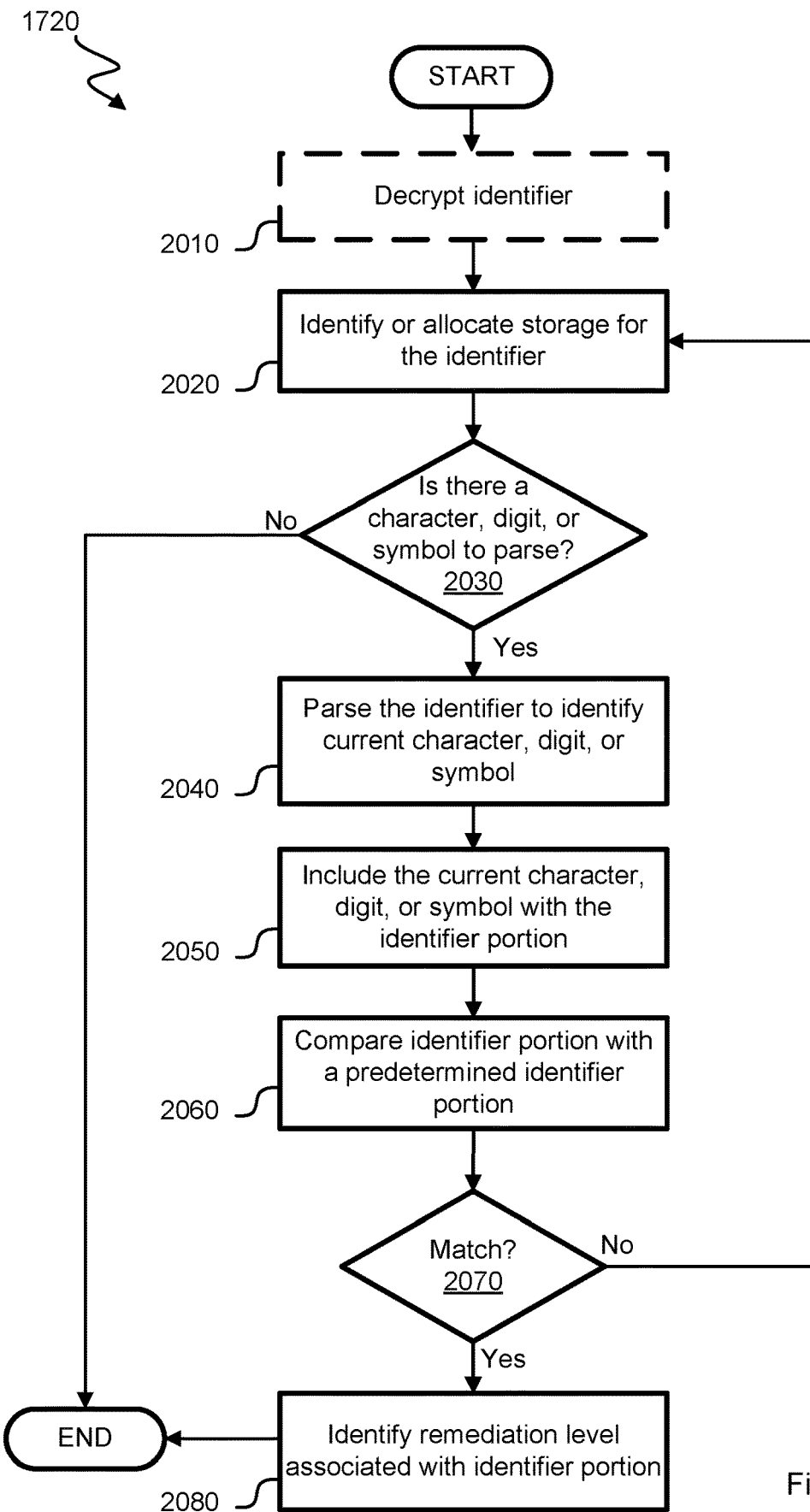
FIG. 20 illustrates an illustrative flow for implementing deidentified access of data described herein, according to at least one example.

With reference now to FIG. 20, a flowchart illustrating one embodiment of implementing deidentified access of data is shown. The process 1920 is performed by one or several of the components of the system 100. The process 1920 begins at block 2010 by decrypting the identifier. The decryption may be optional. For example, the process may determine that the received identifier was encrypted and apply a key to decrypt the identifier (e.g., "XKRE" becomes "1ACG"), as shown in relation to FIG. 12.

At block 2020, the process identifies or allocates storage for the identifier. For example, the identifier may be stored with the identifier data store 680 or other accessible temporary/permanent data store. The process may dynamically allocate portions of storage (e.g. random access memory, virtual memory) and de-allocate the storage when the storage is no longer needed.

At block 2030, the process determines whether the identifier includes a character, digit, or symbol to parse. For example, the identifier "1ACG" includes four characters, digits, or symbols to parse, including "1," "A," "C," and "G." In another example, the identifier "2IRE-5ERW" includes nine characters, digits, or symbols to parse.

A decision from block 2030 may be made. In this example, the process would start at the first character, digit, or symbol to parse, and determine that a character, digit, or symbol is available to parse (e.g., "1"), resulting in proceeding to block 2040. At block 2040, the process parses the identifier to identify the current character, digit, or symbol. For example, at the first step, the process would identify "1." In the second step, the process would identify "A," and so on. Later, for example, if the process had already parsed "1," "A," "C," and "G," the process would determine that no additional characters, digits, or symbols are available to parse. In this instance, the process would end.

At block 2050, the process includes the current character, digit, or symbol with the identifier portion. For example, at the first step, the process would include "1" with the existing identifier. Since this is the first step, the existing identifier would be " ". The "1" identifier portion would be included with the existing identifier to generate " " and "1" or "1." In the second step, the process would identify the existing identifier "1." The process would include "A" with the existing identifier, to generate "1A" after the second step.

At block 2060, the process compares the identifier portion with a predetermined identifier portion. For example, the process would determine that "1" signifies an algebra test based in part on a predetermined identifier portion. The process could receive this information dynamically or in a previous process (not shown). Once the process identifies a current character, digit, or symbol at the first step (e.g., "1"), the process can compare the identifier with the predetermined identifier portion to determine if there is a match.

At block 2070, the process determines whether the identifier portion matches a predetermined identifier portion. In this example, a predetermined identifier portion "1" signifies an algebra test and the received identifier portion is "1." Since these two sources match, the process may determine that the received identifier includes a test strand associated with an algebra test.

A decision from block 2070 may be made. In this example, the identifier portion matches a predetermined identifier portion, so the process would proceed to block 2080. If no match (e.g., predetermined identifier portions included "1A," "5," and "T," and the identifier portion included "1"), the process returns to block 2020.

At block 2080, the process identifies a remediation level associated with the identifier portion. For example, the "1" identifier can identify that data is needed to remediate performance on the algebra strand of the test. In other examples, the identifier may identify particular portions of a strand of the test (e.g., sentence structure in reading comprehension, fractions in arithmetic) and correlate an appropriate remediation level for that strand.

Returning to FIG. 19 at block 1930, the process determines the data for the remediation level. For example, a "low" remediation level for algebra can correspond with step-by-step instructions on how to approach solving the algebra problem, 20 question/answer portions, and instructional videos providing at least 30 minutes of instruction on algebra. In another example, a "medium" remediation level for algebra can correspond with 10 question/answer portions and a 5-minute tutorial.

At block 1940, the process displays the data. For example, the data is provided through a graphical user interface (GUI) that includes the identifier and portions of the GUI reserved for displaying the data. The displayed strands of data can correlate with the strands of the test that were identified by the identifier.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long team, short team, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed:

1. An evaluation system that comprises:
   a network interface controller (NIC) configured to allow communication with a user device via a network;
   a data storage storing identifier portions; a processor; and
   a memory including computer-executable instructions which, when executed by the processor, cause the processor to perform operations including:
   processing an identifier associated with a first test strand and a second test strand that is received via the NIC from the user device, the identifier generated based at least in part on:
   determining a first identifier that identifies the first test strand;
   comparing one or more responses to the first test strand,
   received via the user device, to at least part of a key to determine a first outcome for the first test strand
   determining a first score identifier that identifies the first outcome for the first test strand;
   determining a second identifier that identifies the second test strand;
   comparing the one or more responses to the second test strand,
   received via the user device, to at least part of the key to determine a second outcome for the second test strand;
   determining a second score identifier that identifies the second outcome for the second test strand; and
   including in the identifier the first identifier that identifies the first test strand associated with the first score identifier that identifies the first outcome for the first test strand, and the second identifier that identifies the second test strand associated with the second score identifier that identifies the second outcome;
   identifying first remediate data corresponding to the first identifier, the first score identifier, and the first outcome of the first test strand;
   identifying second remediate data corresponding to the second identifier, the second score identifier, and the second outcome of the second test strand; and causing transmission of one or both of the first remediate data and the second remediate data via the NIC to the user device to facilitate display of one or both of the first remediate data and the second remediate data at the user device.

2. The evaluation system of claim 1, wherein the identifier is encrypted when received, and wherein the processing the identifier includes:
   determining an encryption key associated with the identifier; and
   decrypting the identifier using the encryption key.

3. The evaluation system of claim 1, wherein one or both of the first remediate data and the second remediate data includes a psychographic illustration depicting corresponding test strand performance.

4. The evaluation system of claim 1, wherein one or both of the first remediate data and the second remediate data includes a human-readable description depicting corresponding test strand performance.

5. The evaluation system of claim 1, wherein the operations further comprise:
   processing an access code received from the user device, wherein the access code indicates approval to access data for remediating performance; and
   authenticating the access code before the one or both of the first remediate data and the second remediate data is displayed at the user device.

6. The evaluation system of claim 1, wherein the operations further include:
   parsing the identifier to determine a check portion; and
   determining a validity of the check portion at least in part by:
     assigning numeric values to one or more of the first identifier portion, the first score identifier, the second identifier, and the second score identifier;
     aggregating the numeric values to a single digit check portion number;
     comparing the check portion with the single digit check portion number, and
     when the check portion matches the single digit check portion number, determining that the check portion is a valid check portion.

7. The evaluation system of claim 6, wherein the operations further include:
   when the check portion does not match the single digit check portion number, causing transmission of a notification to the user device regarding the identifier.

8. One or more non-transitory, computer-readable storage media storing computer-executable instructions that, when executed by one or more computer systems, cause the one or more computer systems to perform operations including:
   processing an identifier associated with a first test strand and a second test strand that is received from a user device via a network interface controller (NIC) configured to allow communication with the user device via a network, the identifier generated based at least in part on:
     determining a first identifier that identifies the first test strand;
   comparing one or more responses to the first test strand, received via the user device, to at least part of a key to determine a first outcome for the first test strand;
   determining a first score identifier that identifies the first outcome for the first test strand;
   determining a second identifier that identifies the second test strand;
   comparing the one or more responses to the second test strand, received via the user device, to at least part of the key to determine a second outcome for the second test strand;
   determining a second score identifier that identifies the second outcome for the second test strand; and
   including in the identifier the first identifier that identifies the first test strand associated with the first score identifier that identifies the first outcome for the first test strand, and the second identifier that identifies the second test strand associated with the second score identifier that identifies the second outcome;
   identifying first remediate data corresponding to the first identifier, the first score identifier, and the first outcome of the first test strand;
   identifying second remediate data corresponding to the second identifier, the second score identifier, and the second outcome of the second test strand; and
   causing transmission of one or both of the first remediate data and the second remediate data via the NIC to the user device to facilitate display of one or both of the first remediate data and the second remediate data at the user device.

9. The one or more non-transitory, computer-readable storage media of claim 8, wherein the identifier is encrypted when received, and wherein the processing the identifier includes:
   determining an encryption key associated with the identifier; and decrypting the identifier using the encryption key.

10. The one or more non-transitory, computer-readable storage media of claim 8, wherein one or both of the first remediate data and the second remediate data includes a psychographic illustration depicting corresponding test strand performance.

11. The one or more non-transitory, computer-readable storage media of claim 8, wherein one or both of the first remediate data and the second remediate data includes a human-readable description depicting corresponding test strand performance.

12. The one or more non-transitory, computer-readable storage media of claim 8, wherein the operations further comprise:
   processing an access code received from the user device, wherein the access code indicates approval to access data for remediating performance; and
   authenticating the access code before the one or both of the first remediate data and the second remediate data is displayed at the user device.

13. The one or more non-transitory, computer-readable storage media of claim 8, wherein the operations further include:
   parsing the identifier to determine a check portion; and
   determining a validity of the check portion at least in part by:
     assigning numeric values to one or more of the first identifier, the first score identifier, the second identifier, and the second score identifier;
     aggregating the numeric values to a single digit check portion number;
     comparing the check portion with the single digit check portion number and;
     when the check portion matches the single digit check portion number, determining that the check portion is a valid check portion.

14. The one or more non-transitory, computer-readable storage media of claim 13, wherein the operations further include:

when the check portion does not match the single digit check portion number, causing transmission of a notification to the user device regarding the identifier.

15. A method comprising:

receiving an identifier associated with a first test strand and a second test strand that is from a user device via a network interface controller (NIC) configured to allow communication with the user device via a network, the identifier generated based at least in part on:
determining a first identifier that identifies the first test strand;

comparing one or more responses to the first test strand, received via the user device, to at least part of a key to determine a first outcome for the first test strand;

determining a first score identifier that identifies the first outcome for the first test strand;

determining a second identifier that identifies the second test strand;

comparing the one or more responses to the second test strand, received via the user device, to at least part of the key to determine a second outcome for the second test strand;

determining a second score identifier that identifies the second outcome for the second test strand; and including in the identifier the first identifier that identifies the first test strand associated with the first score identifier that identifies the first outcome for the first test strand, and the second identifier that identifies the second test strand associated with the second score identifier that identifies the second outcome;

identifying first remediate data corresponding to the first identifier, the first score identifier, and the first outcome of the first test strand;

identifying second remediate data corresponding to the second identifier, the second score identifier, and the second outcome of the second test strand; and transmitting of one or both of the first remediate data and the second remediate data via the NIC to the user device to facilitate display of one or both of the first remediate data and the second remediate data at the user device.

16. The method of claim 15, wherein the identifier is encrypted when received and further comprising:

determining an encryption key associated with the identifier; and decrypting the identifier using the encryption key.

17. The method of claim 15, wherein one or both of the first remediate data and the second remediate data includes a psychographic illustration depicting corresponding test strand performance.

18. The method of claim 15, wherein one or both of the first remediate data and the second remediate data includes a human-readable description depicting corresponding test strand performance.

19. The method of claim 15, further comprising:

receiving an access code from the user device, wherein the access code indicates approval to access data for remediating performance; and authenticating the access code before the one or both of the first remediate data and the second remediate data is displayed at the user device.

20. The method of claim 19, further comprising:

parsing the identifier to determine a check portion; and
determining a validity of the check portion at least in part by:

assigning numeric values to one or more of the first identifier, the first score identifier, the second identifier, and the second score identifier;

aggregating the numeric values to a single digit check portion number;

comparing the check portion with the single digit check portion number; and when the check portion matches the single digit check portion number, determining that the check portion is a valid check portion.

* * * * *